United States Patent
Berger et al.

(10) Patent No.: US 11,900,506 B2
(45) Date of Patent: *Feb. 13, 2024

(54) CONTROLLING INTERACTIVE FASHION BASED ON FACIAL EXPRESSIONS

(71) Applicant: Snap Inc., Santa Monica, CA (US)

(72) Inventors: Itamar Berger, Hod Hasharon (IL); Gal Dudovitch, Tel Aviv (IL); Gal Sasson, Kibbutz Ayyelet Hashahar (IL); Ma'ayan Shuvi, Tel Aviv (IL); Matan Zohar, Rishon LeZion (IL)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/470,231

(22) Filed: Sep. 9, 2021

(65) Prior Publication Data
US 2023/0070631 A1 Mar. 9, 2023

(51) Int. Cl.
*G06T 11/00* (2006.01)
*G06V 40/16* (2022.01)
*G06Q 30/0601* (2023.01)

(52) U.S. Cl.
CPC .......... *G06T 11/00* (2013.01); *G06Q 30/0643* (2013.01); *G06V 40/168* (2022.01); *G06V 40/174* (2022.01)

(58) Field of Classification Search
CPC .. G06T 11/00; G06Q 30/0643; G06V 40/168; G06V 40/174
See application file for complete search history.

(56) References Cited

U.S. PATENT DOCUMENTS

| | | | |
|---|---|---|---|
| 5,880,731 A | 3/1999 | Liles et al. |
| 6,023,270 A | 2/2000 | Brush, II et al. |
| 6,223,165 B1 | 4/2001 | Lauffer |
| 6,772,195 B1 | 8/2004 | Hatlelid et al. |
| 6,842,779 B1 | 1/2005 | Nishizawa |
| 7,308,332 B2 | 12/2007 | Okada et al. |
| 7,342,587 B2 | 3/2008 | Danzig et al. |
| 7,468,729 B1 | 12/2008 | Levinson |
| 7,636,755 B2 | 12/2009 | Blattner et al. |

(Continued)

FOREIGN PATENT DOCUMENTS

| | | |
|---|---|---|
| CN | 201986710 U | 9/2011 |
| CN | 109863532 A | 6/2019 |

(Continued)

OTHER PUBLICATIONS

"U.S. Appl. No. 17/446,691, Notice of Allowance dated Oct. 3, 2022", 8 pgs.

(Continued)

*Primary Examiner* — Motilewa Good-Johnson
(74) *Attorney, Agent, or Firm* — SCHWEGMAN LUNDBERG & WOESSNER, P.A.

(57) ABSTRACT

Methods and systems are disclosed for performing operations comprising: receiving an image that includes a depiction of a person wearing a fashion item; generating a segmentation of the fashion item worn by the person depicted in the image; identifying a facial expression of the user depicted in the image; and in response to identifying the facial expression, applying one or more augmented reality elements to the fashion item worn by the person based on the segmentation of the fashion item worn by the person.

20 Claims, 13 Drawing Sheets

(56) References Cited

U.S. PATENT DOCUMENTS

| | | | |
|---|---|---|---|
| 7,639,251 B2 | 12/2009 | Gu et al. | |
| 7,775,885 B2 | 8/2010 | Van et al. | |
| 7,809,192 B2 * | 10/2010 | Gokturk | G06F 16/5846 |
| | | | 382/218 |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,099,462 B2 * | 1/2012 | Sheng | G06F 3/0481 |
| | | | 709/204 |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,275,590 B2 | 9/2012 | Szymczyk et al. | |
| 8,359,247 B2 | 1/2013 | Vock | |
| 8,379,920 B2 | 2/2013 | Yang et al. | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,582,918 B2 * | 11/2013 | Nakada | H04N 5/23219 |
| | | | 382/173 |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,891,880 B2 | 11/2014 | Oami et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,104,907 B2 * | 8/2015 | Whitehill | G06K 9/6292 |
| 9,105,014 B2 | 8/2015 | Collet et al. | |
| 9,241,184 B2 | 1/2016 | Weerasinghe | |
| 9,251,170 B2 | 2/2016 | Moore et al. | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,965,801 B1 | 5/2018 | Wishne et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,109,315 B2 * | 10/2018 | Saban | H04N 5/2624 |
| 10,116,598 B2 | 10/2018 | Tucker et al. | |
| 10,155,168 B2 | 12/2018 | Blackstock et al. | |
| 10,176,636 B1 * | 1/2019 | Neustein | G06T 15/205 |
| 10,217,286 B1 | 2/2019 | Angel et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,282,057 B1 | 5/2019 | Binder et al. | |
| 10,362,219 B2 | 7/2019 | Wilson et al. | |
| 10,402,689 B1 | 9/2019 | Bogdanovych et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,607,411 B1 | 3/2020 | Pezzino et al. | |
| 10,657,701 B2 | 5/2020 | Osman et al. | |
| 11,030,807 B2 * | 6/2021 | Watts | G06T 11/00 |
| 11,202,017 B2 * | 12/2021 | Holzer | H04N 5/2628 |
| 11,263,821 B1 * | 3/2022 | Singh | G06T 11/60 |
| 11,393,133 B2 * | 7/2022 | el Kaliouby | G06V 10/82 |
| 11,636,662 B2 | 4/2023 | Berger et al. | |
| 11,651,572 B2 | 5/2023 | Berger et al. | |
| 11,670,059 B2 | 6/2023 | Berger et al. | |
| 11,673,054 B2 | 6/2023 | Berger et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0231356 A1 * | 9/2009 | Barnes | G06Q 30/0275 |
| | | | 715/781 |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0007174 A1 * | 1/2011 | Bacivarov | H04N 5/23219 |
| | | | 348/222.1 |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |
| 2011/0294564 A1 | 12/2011 | Michelstein et al. | |
| 2011/0298897 A1 | 12/2011 | Sareen et al. | |

(56) References Cited

U.S. PATENT DOCUMENTS

| | | |
|---|---|---|
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0147933 A1* | 6/2013 | Kulas ............. H04N 21/8153 |
| | | 348/61 |
| 2013/0185679 A1 | 7/2013 | Fretwell et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0293530 A1 | 11/2013 | Perez et al. |
| 2014/0010449 A1 | 1/2014 | Haaramo et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0176565 A1 | 6/2014 | Adeyoola et al. |
| 2014/0226000 A1* | 8/2014 | Vilcovsky ............. G06F 3/017 |
| | | 345/156 |
| 2014/0244447 A1* | 8/2014 | Kim ................. G06Q 30/0643 |
| | | 705/27.2 |
| 2015/0206349 A1 | 7/2015 | Rosenthal et al. |
| 2015/0370320 A1 | 12/2015 | Connor |
| 2016/0055370 A1* | 2/2016 | Garcia ............... G06V 40/174 |
| | | 382/118 |
| 2016/0127710 A1* | 5/2016 | Saban .................. H04N 5/2624 |
| | | 386/241 |
| 2016/0134840 A1 | 5/2016 | Mcculloch |
| 2016/0234149 A1 | 8/2016 | Tsuda et al. |
| 2016/0343164 A1* | 11/2016 | Urbach ............... G02B 27/017 |
| 2017/0080346 A1 | 3/2017 | Abbas |
| 2017/0087473 A1 | 3/2017 | Siegel et al. |
| 2017/0091535 A1* | 3/2017 | Yu ....................... G06V 40/165 |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0256084 A1* | 9/2017 | Iglehart .................. G06V 40/16 |
| 2017/0310934 A1 | 10/2017 | Du et al. |
| 2017/0312634 A1 | 11/2017 | Ledoux et al. |
| 2018/0032818 A1 | 2/2018 | Abraham et al. |
| 2018/0047200 A1 | 2/2018 | O'hara et al. |
| 2018/0089883 A1 | 3/2018 | De Goes et al. |
| 2018/0113587 A1 | 4/2018 | Allen et al. |
| 2018/0115503 A1 | 4/2018 | Baldwin et al. |
| 2018/0129870 A1* | 5/2018 | Bacivarov ............ G06V 40/172 |
| 2018/0182171 A1* | 6/2018 | Lipner ..................... G06T 7/70 |
| 2018/0240280 A1 | 8/2018 | Chen et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0050427 A1 | 2/2019 | Wiesel et al. |
| 2019/0057616 A1 | 2/2019 | Cohen et al. |
| 2019/0116322 A1 | 4/2019 | Holzer et al. |
| 2019/0121522 A1* | 4/2019 | Davis ................... H04N 9/3185 |
| 2019/0138796 A1* | 5/2019 | Nakata ................. G02B 27/017 |
| 2019/0188920 A1 | 6/2019 | Mcphee et al. |
| 2019/0205627 A1* | 7/2019 | De la Torre ......... G06V 40/171 |
| 2019/0325279 A1 | 10/2019 | Wang et al. |
| 2019/0325631 A1* | 10/2019 | Cao ...................... G06V 40/174 |
| 2019/0371028 A1* | 12/2019 | Harrises ................. G06T 11/60 |
| 2020/0019364 A1 | 1/2020 | Pond |
| 2020/0066044 A1 | 2/2020 | Stahl et al. |
| 2020/0066052 A1 | 2/2020 | Antonsen et al. |
| 2020/0117938 A1* | 4/2020 | Greenberger ........ G06V 10/255 |
| 2020/0219295 A1* | 7/2020 | el Kaliouby ......... G06F 3/04817 |
| 2020/0228729 A1* | 7/2020 | Okuno ..................... G06T 7/11 |
| 2020/0302175 A1 | 9/2020 | Mason |
| 2021/0375320 A1* | 12/2021 | Wong ................... H04N 21/4223 |
| 2021/0398095 A1 | 12/2021 | Mallett et al. |
| 2022/0327709 A1 | 10/2022 | Dudovitch et al. |
| 2023/0065031 A1 | 3/2023 | Berger et al. |
| 2023/0066179 A1 | 3/2023 | Berger et al. |
| 2023/0075256 A1 | 3/2023 | Berger et al. |
| 2023/0078483 A1 | 3/2023 | Berger et al. |
| 2023/0100509 A1 | 3/2023 | Berger et al. |
| 2023/0103125 A1 | 3/2023 | Berger et al. |
| 2023/0116652 A1 | 4/2023 | Berger et al. |
| 2023/0154129 A1 | 5/2023 | Berger et al. |
| 2023/0169739 A1 | 6/2023 | Berger et al. |

FOREIGN PATENT DOCUMENTS

| | | | |
|---|---|---|---|
| CN | 110168478 A | 8/2019 | |
| CN | 110310319 A | 10/2019 | |
| CN | 110096156 B | 6/2021 | |
| EP | 2184092 A2 | 5/2010 | |
| EP | 3155560 B1 | 5/2020 | |
| EP | 3772040 A1 | 2/2021 | |
| JP | 2001230801 A | 8/2001 | |
| JP | 5497931 B2 | 3/2014 | |
| JP | 5722603 B2 | 4/2015 | |
| KR | 101445263 B1 | 9/2014 | |
| KR | 20190097815 A * | 8/2018 | |
| WO | WO-2003094072 A1 | 11/2003 | |
| WO | WO-2004095308 A1 | 11/2004 | |
| WO | WO-2006107182 A1 | 10/2006 | |
| WO | WO-2007134402 A1 | 11/2007 | |
| WO | WO-2012139276 A1 | 10/2012 | |
| WO | WO-2013027893 A1 | 2/2013 | |
| WO | WO-2013152454 A1 | 10/2013 | |
| WO | WO-2013166588 A1 | 11/2013 | |
| WO | WO-2014031899 A1 | 2/2014 | |
| WO | WO-2014194439 A1 | 12/2014 | |
| WO | WO-2016054164 A1 * | 4/2016 | ......... G06F 3/04845 |
| WO | WO-2016090605 A1 | 6/2016 | |
| WO | WO-2017008427 A1 | 1/2017 | |
| WO | WO-2017203262 A2 | 11/2017 | |
| WO | WO-2018075053 A1 | 4/2018 | |
| WO | WO-2018081013 A1 | 5/2018 | |
| WO | WO-2018102562 A1 | 6/2018 | |
| WO | WO-2018129531 A1 | 7/2018 | |
| WO | WO-2019089613 A1 | 5/2019 | |
| WO | WO-2019162842 A1 * | 8/2019 | |
| WO | WO-2020163592 A1 | 8/2020 | |
| WO | WO-2021174139 A1 | 9/2021 | |
| WO | WO-2022125167 A1 | 6/2022 | |
| WO | WO-2022221243 A2 | 10/2022 | |
| WO | WO-2022221243 A3 | 10/2022 | |
| WO | WO-2023034832 A1 | 3/2023 | |
| WO | WO-2023039183 A1 | 3/2023 | |
| WO | WO-2023039390 A1 | 3/2023 | |
| WO | WO-2023055825 A1 | 4/2023 | |
| WO | WO-2023055842 A1 | 4/2023 | |

OTHER PUBLICATIONS

"U.S. Appl. No. 17/468,379, Final Office Action dated Oct. 24, 2022", 7 pgs.

"U.S. Appl. No. 17/468,379, Response filed Oct. 4, 2022 to Non Final Office Action dated Jul. 6, 2022", 11 pgs.

"U.S. Appl. No. 17/468,379, Response filed Dec. 13, 2022 to Final Office Action dated Oct. 24, 2022", 10 pgs.

"U.S. Appl. No. 17/490,209, Notice of Allowance dated Nov. 23, 2022", 9 pgs.

"U.S. Appl. No. 17/498,475, Notice of Allowance dated Nov. 16, 2022", 11 pgs.

"U.S. Appl. No. 17/498,475, Response filed Oct. 27, 2022 to Non Final Office Action dated Aug. 5, 2022", 9 pgs.

"Application Serial No. PCT/US2022/024364, Invitation to Pay Additional Fees dated Sep. 15, 2022", 12 pgs.

"International Application Serial No. PCT/US2022/024364, International Search Report dated Nov. 8, 2022", 7 pgs.

"International Application Serial No. PCT/US2022/024364, Written Opinion dated Nov. 8, 2022", 11 pgs.

"International Application Serial No. PCT/US2022/075707, International Search Report dated Dec. 20, 2022", 4 pgs.

"International Application Serial No. PCT/US2022/075707, Written Opinion dated Dec. 20, 2022", 5 pgs.

(56) References Cited

OTHER PUBLICATIONS

"International Application Serial No. PCT/US2022/076006, International Search Report dated Dec. 23, 2022", 4 pgs.

"International Application Serial No. PCT/US2022/076006, Written Opinion dated Dec. 23, 2022", 4 pgs.

Aiyu, Cui, et al., "Dressing in Order: Recurrent Person Image Generation for Pose Transfer, Virtual Try-on and Outfit Editing", arxiv.org, Cornell University. Library, 201 Olin Library Cornell University Ithaca, NY 14853, (Aug. 31, 2021), 19 pgs.

Hobley, Michael A, et al., "Say Yes to the Dress: Shape and Style Transfer Using Conditional GAN", Advances in Databases and Information Systems; [Lecture Notes in Computer Science; Lect. Notes Computer], Springer International Publishing, Cham, (May 29, 2019), 135-149.

Liu, Si, et al., "Fashion Parsing With Video Context", IEEE Transactions on Multimedia, IEEE, USA, vol. 17, No. 8, (Aug. 1, 2015), 1347-1358.

Raj, Amit, et al., "SwapNet: Image Based Garment Transfer", Pattern Recognition : 5th Asian Conference, ACPR 2019, Auckland, New Zealand, Nov., (Oct. 6, 2018), 17 pgs.

"U.S. Appl. No. 17/446,691, Non Final Office Action dated Jun. 20, 2022", 24 pgs.

"U.S. Appl. No. 17/468,379, Non Final Office Action dated Jul. 6, 2022", 6 pgs.

"Curiscope Virtuali-Tee app", as evidenced by a YouTube video, Curiscope's VirtualiTee: Wearable tech you learn with—YouTube, [Online] Retrieved from the Internet: <URL: https://www.youtube.com/watch?v=QOHfdqgwFU>, (Mar. 1, 2016), 1 pg.

"U.S. Appl. No. 17/490,209, Notice of Allowance dated Jul. 21, 2022", 10 pgs.

"U.S. Appl. No. 17/498,475, Non Final Office Action dated Aug. 5, 2022", 25 pgs.

"U.S. Appl. No. 17/446,691, Response filed Sep. 19, 2022 to Non Final Office Action dated Jun. 20, 2022", 10 pgs.

Bradley, "Augmented Reality on Cloth with Realistic Illumination", Machine Vison and Applications 20, (2009), 85-92.

Wang, "Estimation of multiple directional light sources for synthesis of augmented reality images", Elsevier Science, Graphical Models 65, (Dec. 31, 2003), 185-205.

"U.S. Appl. No. 17/446,691, Corrected Notice of Allowability dated Feb. 15, 2023", 2 pgs.

"U.S. Appl. No. 17/446,691, Notice of Allowance dated Jan. 25, 2023", 5 pgs.

"U.S. Appl. No. 17/447,509, Notice of Allowance dated Apr. 3, 2023", 8 pgs.

"U.S. Appl. No. 17/468,379, Notice of Allowance dated Jan. 10, 2023", 5 pgs.

"U.S. Appl. No. 17/468,379, Notice of Allowance dated Apr. 26, 2023", 7 pgs.

"U.S. Appl. No. 17/490,167, Final Office Action dated May 10, 2023", 18 pgs.

"U.S. Appl. No. 17/490,167, Non Final Office Action dated Jan. 19, 2023", 13 pgs.

"U.S. Appl. No. 17/490,167, Response filed Apr. 4, 2023 to Non Final Office Action dated Jan. 19, 2023", 10 pgs.

"U.S. Appl. No. 17/490,209, Notice of Allowance dated Mar. 10, 2023", 9 pgs.

"U.S. Appl. No. 17/498,475, Corrected Notice of Allowability dated Apr. 5, 2023", 2 pgs.

"U.S. Appl. No. 17/498,475, Notice of Allowance dated Mar. 8, 2023", 5 pgs.

"International Application Serial No. PCT/US2022/043094, International Search Report dated Jan. 4, 2023", 5 pgs.

"International Application Serial No. PCT/US2022/043094, Written Opinion dated Jan. 4, 2023", 7 pgs.

"International Application Serial No. PCT/US2022/045075, International Search Report dated Jan. 26, 2023", 4 pgs.

"International Application Serial No. PCT/US2022/045075, Written Opinion dated Jan. 26, 2023", 6 pgs.

"International Application Serial No. PCT/US2022/045099, International Search Report dated Feb. 2, 2023", 5 pgs.

"International Application Serial No. PCT/US2022/045099, Written Opinion dated Feb. 2, 2023", 9 pgs.

Hashmi, Mohammad Farukh, et al., "FashionFit: Analysis of Mapping 3D Pose and Neural Body Fit for Custom Virtual Try-On", IEEE Access, IEEE, USA, vol. 8, (May 11, 2020), 91603-91615.

Hilsmann, et al., "Tracking and Retexturing Cloth for Real-Time Virtual Clothing Applications", Springer-Verlag Berlin Heidelberg 2009, (2009), 12 pgs.

Hobley, Michael, et al., "Say Yes to the Dress: Shape and Style Transfer Using Conditional GANs", Advances in Databases and Information Systems; [Lecture Notes in Computer Science; Lect. Notes Computer], Springer International Publishing, Cham, Page(S), (May 29, 2019), 15 pgs.

Liu, Li, et al., "A data-driven editing framework for automatic 3D garment modeling", date unknown Multimed Tools Appl 76, 2017, (2017), 12597-12626.

Pons-Moll, et al., "Clothing Capture and Retargeting", ACM Transactions on Graphics, vol. 36, No. 4, (2017), 15 pgs.

Xueping, Su, et al., "Personalized Clothing Recommendation Based on User Emotional Analysis", Discrete Dynamics In Nature and Society, vol. 2020, [Online]. Retrieved from the Internet: <URL:http://downloads.hindawi.com/journals/ddns/2020/7954393.XML>, (Mar. 5, 2020), 8 pgs.

Yang, et al., "Recognize the Silhouette Attributes of T-shirts based on Mask R-CNN", IEEE, (Apr. 2021), 5 pgs.

Yoon, Shin Jae, et al., "Neural 3D Clothes Retargeting from a Single Image", Cornell University Library, 201 Olin Library Cornell University Ithaca, NY 14853, (Jan. 29, 2021), 20 pgs.

Zhaoqi, Su, et al., "MulayCap: Multi-layer Human Performance Capture Using a Monocular Video Camera", arxiv.org, Cornell University Library, 201 Olin Library Cornell University Ithaca, NY 14853, (Oct. 1, 2020), 18 pgs.

U.S. Appl. No. 18/138,269, filed Apr. 24, 2023, Controlling Interactive Fashion Based on Body Gestures.

U.S. Appl. No. 18/101,673, filed Jan. 26, 2023, Light and Rendering of Garments.

U.S. Appl. No. 18/098,799, filed Jan. 19, 2023, Body Normal Network Light and Rendering Control.

"U.S. Appl. No. 17/490,167, Response filed Jun. 28, 2023 to Final Office Action dated May 10, 2023", 13 pgs.

\* cited by examiner

── 1 ──

CONTROLLING INTERACTIVE FASHION BASED ON FACIAL EXPRESSIONS

TECHNICAL FIELD

The present disclosure relates generally to providing augmented reality experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
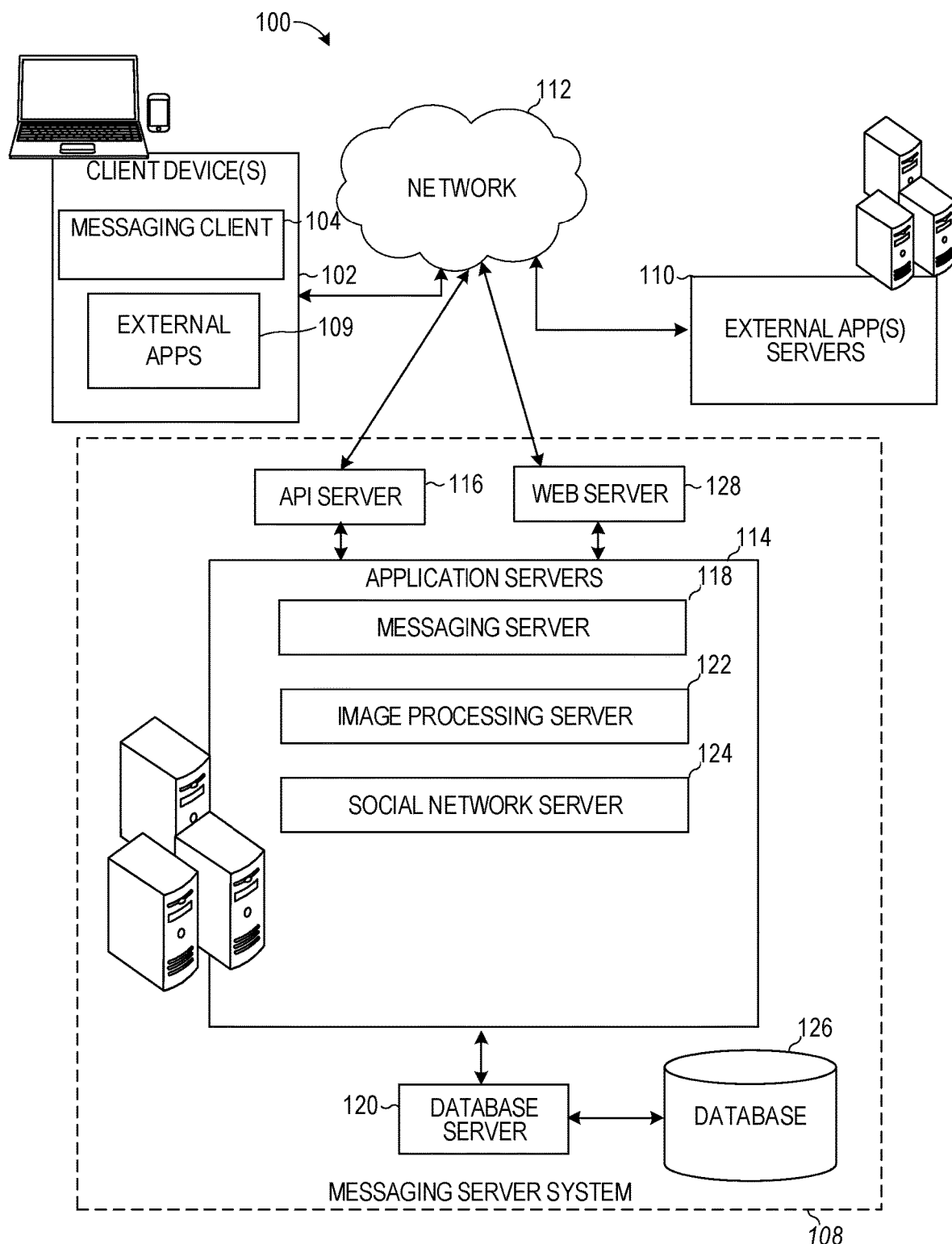
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems display images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a face of the user is detected. Specifically, such systems can use specialized techniques that are optimized for recognizing a face of a user to identify the background in the images that depict the user's face. These systems can then replace only those pixels that depict the background so that the real-world background is replaced with an alternate background in the images. Such systems though are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as articles of clothing.

The disclosed techniques improve the efficiency of using the electronic device by segmenting articles of clothing or garments worn by a user depicted in an image or video, such as a shirt worn by the user depicted in the image in addition to segmenting the whole body of the user depicted in the image or video. By segmenting the articles of clothing or garments worn by a user or worn by different respective users depicted in an image and segmenting the whole body of the user, the disclosed techniques can apply one or more visual effects to the image or video based on gestures performed by the user in the image or video. Particularly, the disclosed techniques can apply one or more augmented reality elements to a shirt depicted in the image or video and then modify the one or more augmented reality elements based on a facial expression of the user in the image or video.

In an example, the disclosed techniques apply a machine learning technique to generate a segmentation of a shirt worn by a user depicted in an image (e.g., to distinguish pixels corresponding to the shirt or multiple garments worn by the user from pixels corresponding to a background of the image or a user's body parts). In this way, the disclosed techniques can apply one or more visual effects (e.g., based on identified facial expressions) to the shirt worn by a user that has been segmented in the current image. Also, by generating the segmentation of the shirt, a position/location of the shirt in a video feed can be tracked independently or separately from positions of a user's body parts, such as a hand. This enables the disclosed techniques to detect activation of or selections associated with augmented reality elements displayed on the shirt worn by the user based on a location of the user's hand in the video feed. For example, a user's hand can be detected as being positioned over a given augmented reality element displayed on the shirt and, in response, the corresponding option represented by the given augmented reality element can be activated or selected.

As a result, a realistic display is provided that shows the user wearing a shirt while also presenting augmented reality elements on the shirt in a way that is intuitive for the user to interact with and select. As used herein, "article of clothing" and "garment" are used interchangeably and should be understood to have the same meaning. This improves the overall experience of the user in using the electronic device. Also, by performing such segmentations without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
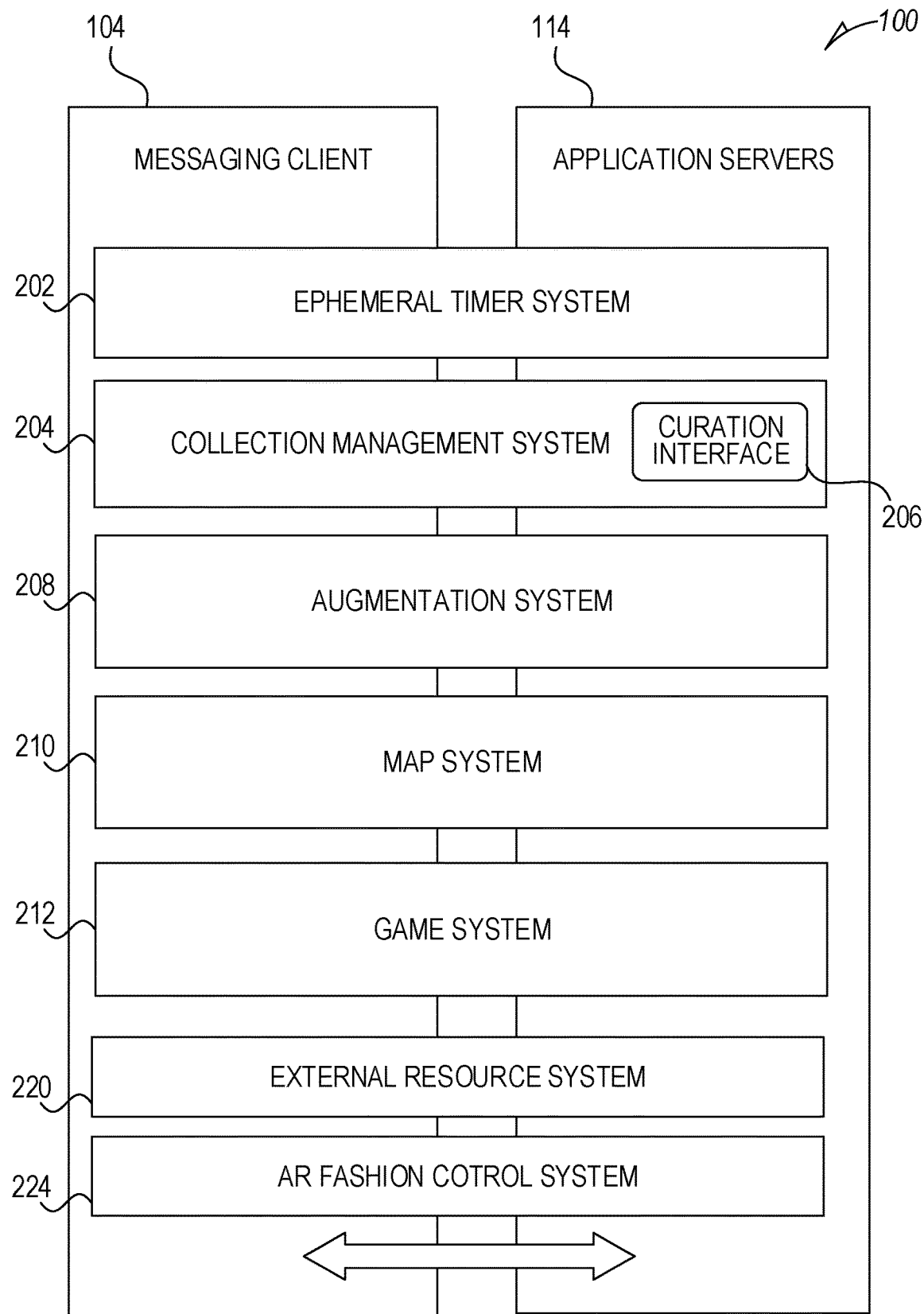
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
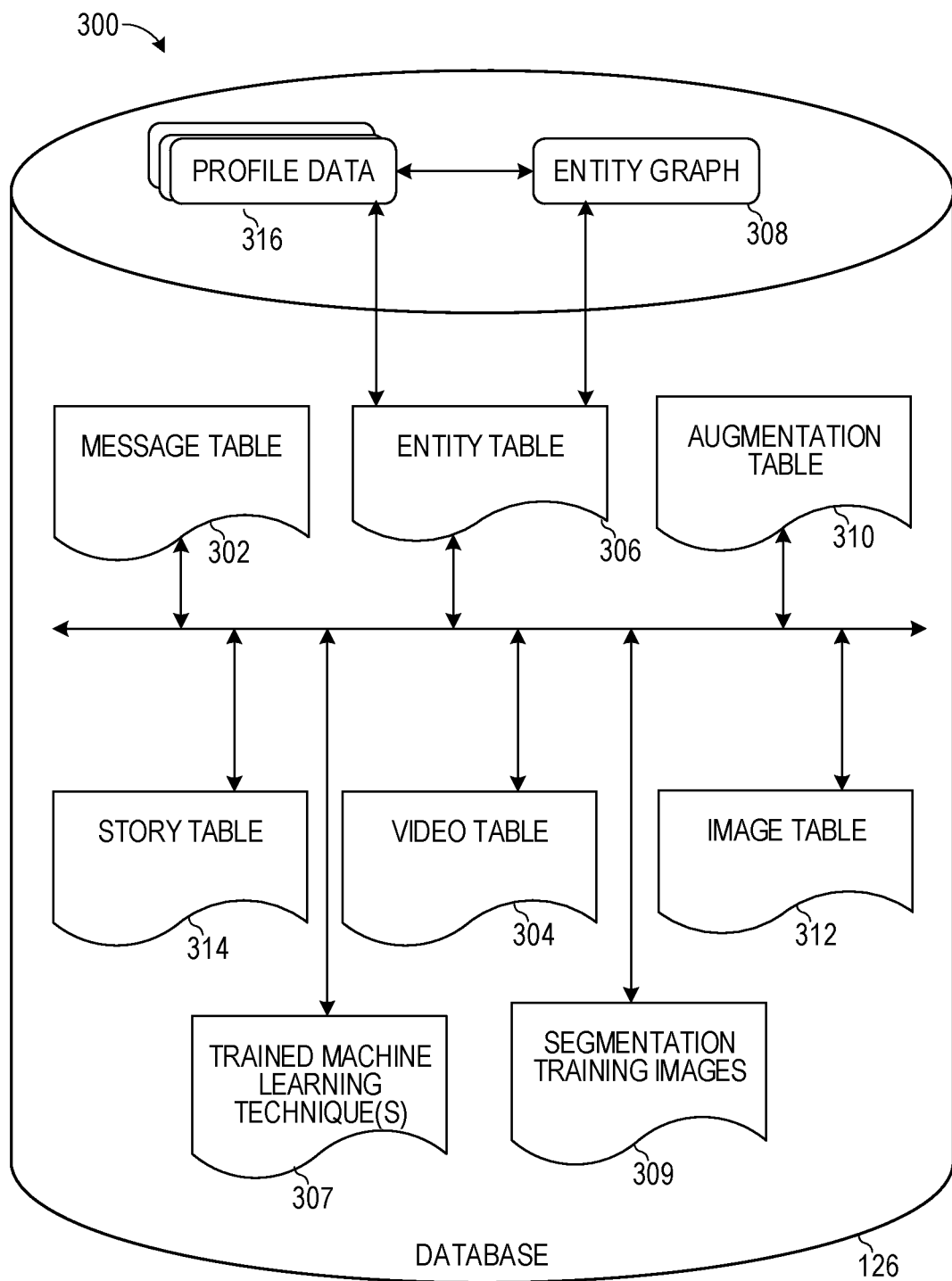
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present to a user one or more AR experiences that can be controlled based on facial expressions of a person depicted in the image. As an example, the messaging client 104 can detect a face of a person in an image or video captured by the client device 102. The messaging client 104 can segment an article of clothing (or fashion item), such as a shirt, in the image or video. While the disclosed examples are discussed in relation to a shirt worn by a person (or user of the client device 102) depicted in an image or video, similar techniques can be applied to any other article of clothing or fashion item, such as a dress, pants, glasses, jewelry, a hat, ear muffs, and so forth.

In response to segmenting the shirt, the messaging client 104 can track the 2D/3D position of the shirt in the video separately from the position of the body of the person or user. This enables the messaging client 104 to present one or more AR graphical elements on the shirt and allows the messaging client 104 to modify the AR graphical elements based on facial expressions performed by the person detected by tracking movement of a body part of the user in relation to the segmented shirt.

As one example, the messaging client 104 can generate text for display on the shirt worn by the person depicted in the image or video. The text can be rendered on the shirt worn by the person in response to detecting a particular facial expression, or words of existing text can be replaced with other words based on changes to facial expressions of the person depicted in the image or video. For example, the messaging client 104 can detect a face of the person depicted in the image or video. In response to detecting the face, the messaging client 104 can apply one or more machine learning techniques to features of the face to detect a facial expression of the face (e.g., to detect that the facial expression is associated with a particular emotion or mood, such as happy, sad, surprised, confused, upset, and so forth). The messaging client 104 can search a database of words to identify one or more words that are associated with the facial expression (e.g., the emotion or mood of the facial expression). The messaging client 104 can select a subset of the identified words, such as based on a rank, popularity, user profile, randomness, uniqueness, or any combination thereof. The messaging client 104 can then add an augmented reality element that includes text to the shirt worn by the person in the image or video. The messaging client 104 can include, in the text of the augmented reality element, the selected subset of the identified words.

In some implementations, the messaging client 104 can detect a phrase written physically on the shirt worn by the person depicted in the image or video. The messaging client 104 can perform word recognition to the phrase to identify a word associated with an adjective that describes an emotion or mood. In response to identifying the word associated with the adjective, the messaging client 104 can generate an augmented reality version of the identified word and include text in the augmented reality version that represents the facial expression. The messaging client 104 can replace the physical word with the augmented reality version of the word, such as by overlaying the augmented reality version of the word on top of the physical word that is on the shirt worn by the person depicted in the image or video. In this way, the messaging client 104 can generate new text or modify existing text on the shirt worn by the person depicted in the image or video to represent a facial expression of the person depicted in the image or video. As the facial expression changes in real time, the messaging client 104 can update the augmented reality words displayed on the shirt worn by the person depicted in the image or video to represent different facial expressions.

As one example, the messaging client 104 can generate an image or video for display on the shirt worn by the person depicted in the image or video. The image or video can be rendered on the shirt worn by the person in response to detecting a particular facial expression, or an image or video that is playing or displayed in the background can be adjusted based on changes to facial expressions of the person depicted in the image or video. For example, the messaging client 104 can detect a face of the person depicted in the image or video. In response to detecting the face, the messaging client 104 can apply one or more machine learning techniques to features of the face to detect a facial expression of the face (e.g., to detect that the facial expression is associated with a particular emotion or mood, such as happy, sad, surprised, confused, upset, and so forth). The messaging client 104 can search a database of words to identify one or more words that are associated with the facial expression (e.g., the emotion or mood of the facial expression). The messaging client 104 can select a subset of the identified words, such as based on a rank, popularity, user profile, randomness, uniqueness, or any combination thereof. The messaging client 104 can then search for an image or video (e.g., an avatar or emoji) associated with the selected subset of the identified words and add the image or video to the shirt worn by the person in the image or video.

For example, the messaging client 104 can detect that the facial expression is associated with a happy emotion. In response, the messaging client 104 can search for videos associated with a happy metadata tag and that have a popularity value that exceeds a popularity threshold. The messaging client 104 can then select a random one of the videos and display the selected video on the shirt worn by the person depicted in the image or video. As another example, the messaging client 104 can detect that the facial expression is associated with a sad emotion. In response, the messaging client 104 can search for images associated with a sad metadata tag and that have a popularity value that exceeds a popularity threshold. The messaging client 104 can then select a random one of the images and display the selected image on the shirt worn by the person depicted in the image or video. As another example, the messaging client 104 can detect a media item (e.g., an image or video) that is being displayed or played in the background of the image or video that depicts the person. The messaging client 104 can search a database of media item parameter adjustments to identify a media item parameter adjustment associated with the facial expression of the person depicted in the image or video. The messaging client 104, in response to identifying the media item parameter adjustment, can adjust the media item (e.g., the aspect ratio, the brightness, pause, play, fast-forward, rewind) based on the identified media item parameter. Specifically, if the messaging client 104 determines that the facial expression is upset, the messaging client 104 can identify a skip chapter media item parameter adjustment associated with an upset emotion. The messaging client 104 can apply that skip chapter parameter adjustment to a video being played in the background of the image or video that depicts the person wearing the shirt.

As another example, the messaging client 104 can adjust an expression of an augmented reality avatar or emoji depicted on a shirt worn by a person in the image or video to match the facial expression of the person depicted in the image or video. For example, the messaging client 104 can detect a face of the person depicted in the image or video. In response to detecting the face, the messaging client 104 can apply one or more machine learning techniques to features of the face to detect a facial expression of the face (e.g., to detect that the facial expression is associated with a particular emotion or mood, such as happy, sad, surprised, confused, upset, and so forth). The messaging client 104 can search a database of avatar or emoji expressions that are associated with the facial expression (e.g., the emotion or mood of the facial expression). The messaging client 104 can then adjust a facial expression of an avatar or emoji displayed on the shirt worn by the person depicted in the image or video to match or correspond to the facial expression of the person depicted in the image or video.

As one example, the messaging client 104 can adjust a fashion item pattern, type, or style based on makeup applied to a face of a person depicted in an image or video. For example, the messaging client 104 can process one or more facial features of a person depicted in an image or video. The messaging client 104 can determine a style of the makeup on the face of the person. The makeup can be physically applied to the face of the person depicted in the image or can be applied in augmented reality using an augmented reality makeup try-on experience. In an implementation, the messaging client 104 applies a machine learning technique to the makeup features or the face of the person depicted in the image or video to estimate a classification of the makeup on the face of the person. Once the makeup classification is estimated, a corresponding style of the makeup is determined. The messaging client 104 can search a database of fashion item patterns, types, or styles to identify a fashion item pattern, type or style associated with the style of makeup. The messaging client 104 can then select a given one of the fashion item patterns, styles, or types to generate an augmented reality graphical element associated with the selected fashion item pattern, style, or type. The messaging client 104 applies the augmented reality graphical element to the fashion item worn by the person depicted in the image or video.

For example, the messaging client 104 can determine that the style of the makeup is associated with a particular animal (e.g., a lion or zebra). In such cases, the messaging client 104 obtains a characteristic of the animal (e.g., zebra or lion stripes) and applies augmented reality zebra or lion stripes to a shirt worn by the person depicted in the image or video. In an implementation, the messaging client 104 adds an augmented reality headwear to the person's head (e.g., to represent horns) of the animal. As another example, the messaging client 104 can determine that the makeup type is associated with a goth style and, in response, the messaging client 104 modifies a color, pattern, or type of clothing worn by the person. The modification can be performed by occluding or overlaying a portion of the physical clothing worn by the person with augmented reality clothing.

As another example, the messaging client 104 can display, on the shirt depicted in the image or video, an augmented reality version of an augmented reality facial effect applied to the face of the person depicted in the image or video. Specifically, the messaging client 104 can detect an augmented reality facial effect applied to the face of the person depicted in the image (e.g., such as augmented reality makeup). The messaging client 104 can, in response, generate an augmented reality version of the augmented reality facial effect by copying a style, pattern, pose, outline, and color of the face of the person to which the augmented reality facial effect has been applied into an augmented reality version. The messaging client 104 can then overlay the augmented reality version of the facial effect on top of a specified portion of the shirt worn by the person depicted in the image or video. In some cases, the messaging client 104 can present a purchase option together with the depiction of the shirt and augmented reality version of the facial effect on top of the shirt. In response to receiving a user selection of the purchase option, the messaging client 104 can transmit an image of the shirt with the augmented reality version of the facial effect to a vendor that manufactures shirts. The messaging client 104 can instruct the vendor to create a physical shirt in a size associated with the person that resembles the shirt worn by the user augmented with the augmented reality version of the facial effect. The manufactured shirt is then shipped to the home of the person.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR fashion control system 224 segments a fashion item, such as a shirt, worn by a user depicted in an image (or video) or multiple fashion items worn respectively by multiple users depicted in an image (or video). An illustrative implementation of the AR fashion control system 224 is shown and described in connection with FIG. 5 below.

Specifically, the AR fashion control system 224 is a component that can be accessed by an AR/VR application implemented on the client device 102. The AR/VR application uses an RGB camera to capture a monocular image of a user and the garment or garments (alternatively referred to as fashion item(s)) worn by the user. The AR/VR application applies various trained machine learning techniques on the captured image of the user wearing the garment to segment the garment (e.g., a shirt, jacket, pants, dress, and so forth) worn by the user in the image and to apply one or more AR visual effects to the captured image. Segmenting the garment results in an outline of the borders of the garment that appear in the image or video. Pixels within the borders of the segmented garment correspond to the garment or clothing worn by the user. The segmented garment is used to distinguish the clothing or garment worn by the user from other objects or elements depicted in the image, such as parts of the user's body (e.g., arms, head, legs, and so forth) and the background of the image which can be separately segmented and tracked. In some implementations, the AR/VR application continuously captures images of the user wearing the garment in real time or periodically to continuously or periodically update the applied one or more visual effects. This allows the user to move around in the real world and see the one or more visual effects update in real time.

In order for the AR/VR application to apply the one or more visual effects directly from a captured RGB image, the AR/VR application obtains a trained machine learning technique from the AR fashion control system 224. The trained machine learning technique processes the captured RGB image to generate a segmentation from the captured image that corresponds to the garment worn by the user(s) depicted in the captured RGB image.

In training, the AR fashion control system 224 obtains a first plurality of input training images that include depictions of one or more users wearing different garments. These training images also provide the ground truth information about the segmentations of the garments worn by the users depicted in each image. A machine learning technique (e.g., a deep neural network) is trained based on features of the plurality of training images. Specifically, the first machine learning technique extracts one or more features from a given training image and estimates a segmentation of the garment worn by the user depicted in the given training image. The machine learning technique obtains the ground truth information corresponding to the training image and adjusts or updates one or more coefficients or parameters to improve subsequent estimations of segmentations of the garment, such as the shirt.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters that have been trained during training of the AR fashion control system 224. For example, trained machine learning techniques 307 stores the trained parameters of one or more neural network machine learning techniques.

Segmentation training images 309 stores a plurality of images that each depict one or more users wearing different garments. The plurality of images stored in the segmentation training images 309 includes various depictions of one or more users wearing different garments together with segmentations of the garments that indicate which pixels in the images correspond to the garments and which pixels correspond to a background or a user's body parts in the images. Namely the segmentations provide the borders of the garments depicted in the images. These segmentation training images 309 are used by the AR fashion control system 224 to train the machine learning technique used to generate a segmentation of one or more garments depicted in a received RGB monocular image. In some cases, the segmentation training images 309 include ground truth skeletal key points of one or more bodies depicted in the respective training monocular images to enhance segmentation performance on various distinguishing attributes (e.g., shoulder straps, collar or sleeves) of the garments. In some cases, the segmentation training images 309 include a plurality of image resolutions of bodies depicted in the images. The segmentation training images 309 can include labeled and unlabeled image and video data. The segmentation training images 309 can include a depiction of a whole body of a particular user, an image that lacks a depiction of any user (e.g., a negative image), a depiction of a plurality of users wearing different garments, and depictions of users wearing garments at different distances from an image capture device.

The segmentation training images 309 can also store various depictions of different facial expressions of different users. In this case, the segmentation training images 309 are used by the AR fashion control system 224 to train the machine learning technique to identify a facial expression of a person depicted in an image or video. The segmentation training images 309 include ground truth emotions or moods associated with a depicted facial expression that is used to train the machine learning technique.

The segmentation training images 309 can also store various depictions of different makeup features applied to faces of different users. In this case, the segmentation training images 309 are used by the AR fashion control system 224 to train the machine learning technique to estimate a makeup classification of real or AR makeup applied to a face of a person depicted in an image or video. The segmentation training images 309 include ground truth makeup classifications associated with a depicted makeup that is used to train the machine learning technique.

Data Communications Architecture

Figure 4:
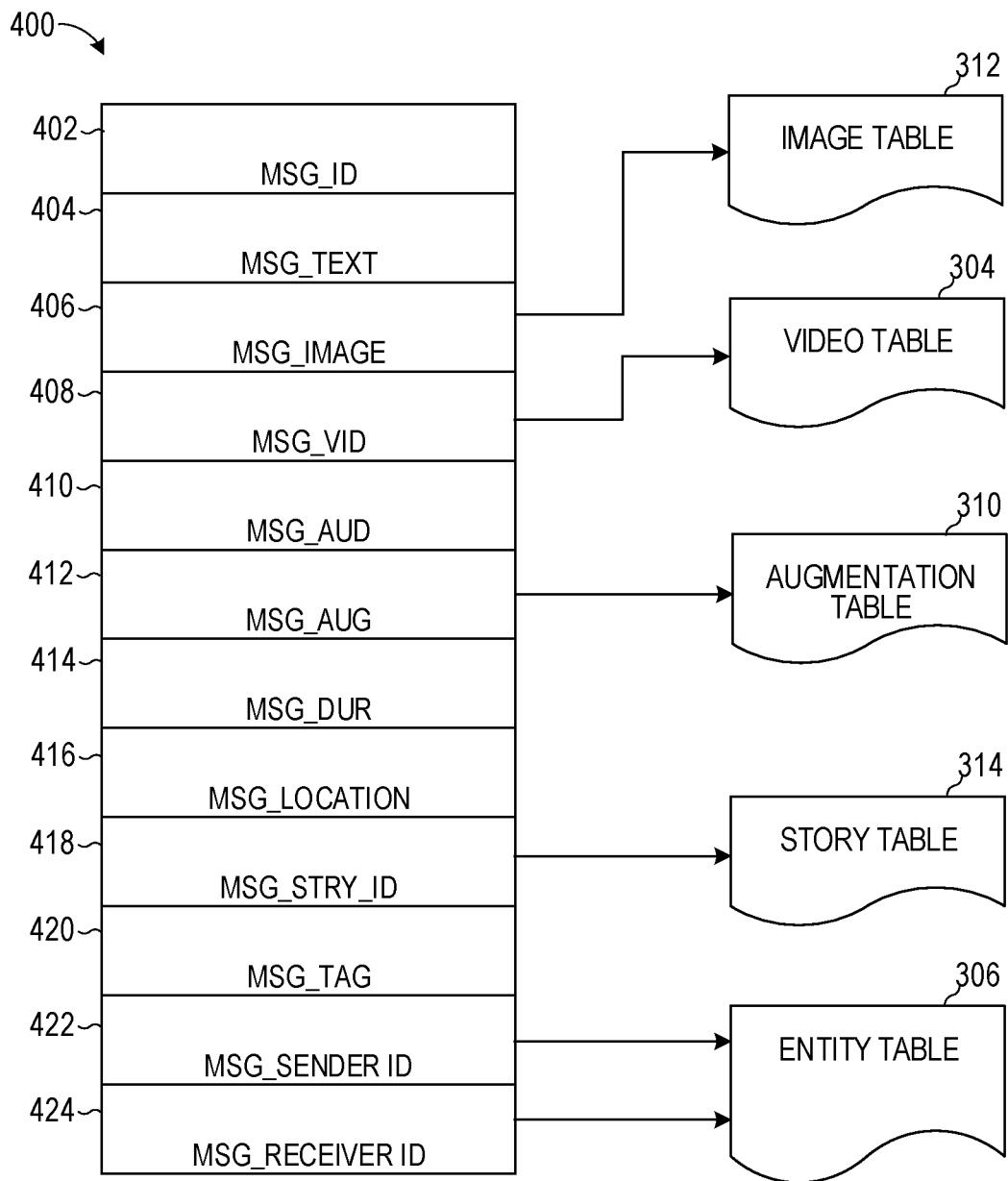
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Fashion Control System

Figure 5:
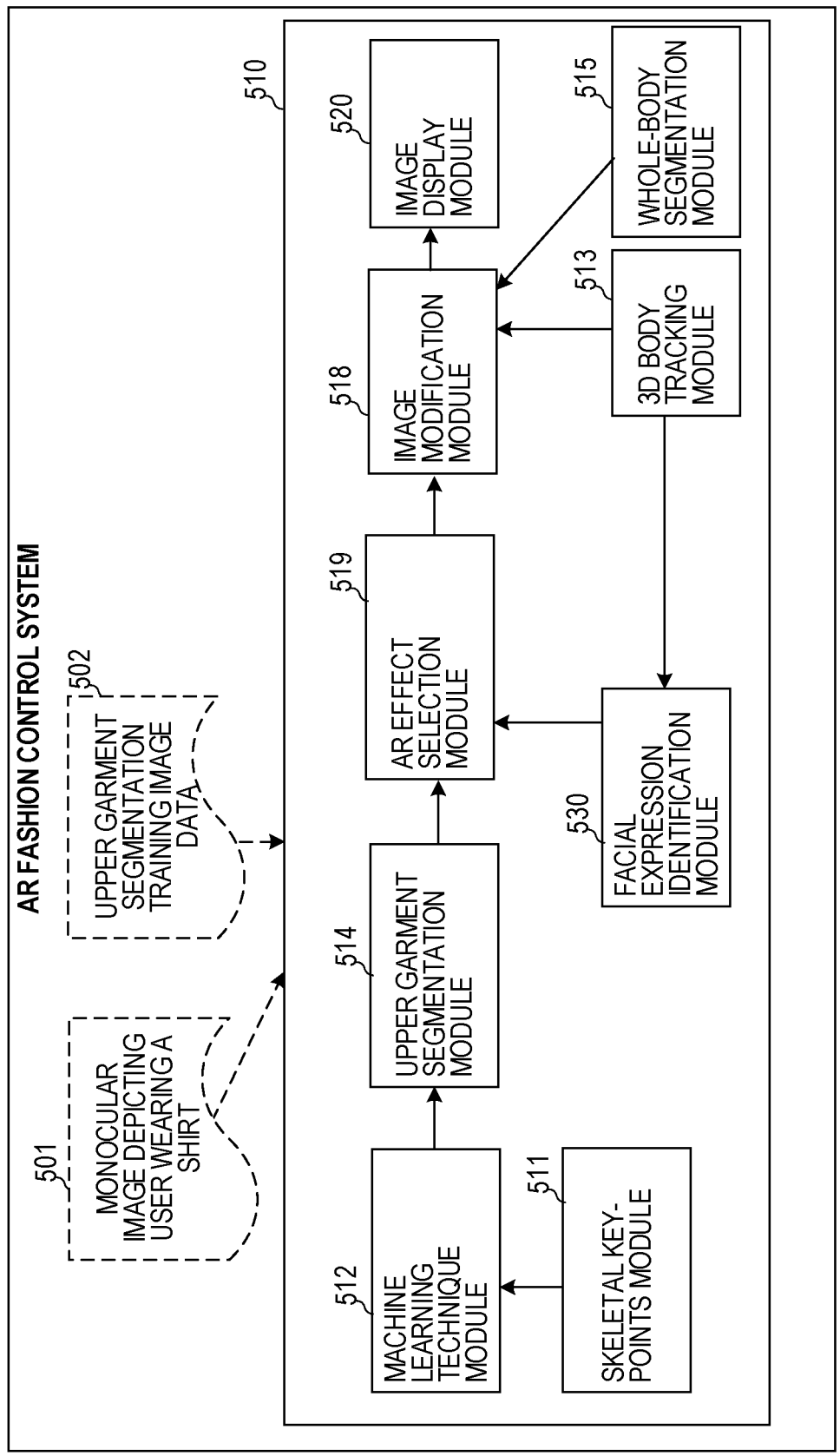
FIG. 5 is a block diagram showing an example AR fashion control system, according to example examples.

FIG. 5 is a block diagram showing an example AR fashion control system 224, according to example examples. AR fashion control system 224 includes a set of components 510 that operate on a set of input data (e.g., a monocular image 501 depicting a real body of a user wearing a shirt and segmentation training image data 502). The set of input data is obtained from segmentation training images 309 stored in database(s) (FIG. 3) during the training phases and is obtained from an RGB camera of a client device 102 when an AR/VR application is being used, such as by a messaging client 104. AR fashion control system 224 includes a machine learning technique module 512, a skeletal keypoints module 511, a upper garment segmentation module 514, an image modification module 518, an AR effect selection module 519, a facial expression identification module 530, a 3D body tracking module 513, a whole-body segmentation module 515, and an image display module 520.

During training, the AR fashion control system 224 receives a given training image (e.g., monocular image 501 depicting a real body of a user wearing a garment, such as an image of a user wearing as a shirt (short sleeve, t-shirt, or long sleeve), jacket, tank top, sweater, and so forth, a lower body garment, such as pants or a skirt, a whole body garment, such as a dress or overcoat, or any suitable combination thereof or depicting multiple users simultaneously wearing respective combinations of upper body garments, lower body garments or whole body garments) from segmentation training image data 502. The AR fashion control system 224 applies one or more machine learning techniques using the machine learning technique module 512 on the given training image. The machine learning technique module 512 extracts one or more features from the given training image to estimate a segmentation of the garment(s) worn by the user(s) depicted in the image. For example, the machine learning technique module 512 obtains the given training image depicting a user wearing a shirt. The machine learning technique module 512 extracts features from the image and segments or specifies which pixels in the image correspond to the shirt worn by the user and which pixels correspond to a background or correspond to parts of the user's body. Namely, the segmentation output by the machine learning technique module 512 identifies borders of a garment (e.g., the shirt) worn by the user in the given training image.

The machine learning technique module 512 retrieves garment segmentation information associated with the given training image. The machine learning technique module 512 compares the estimated segmentation (that can include an identification of multiple garments worn by respective users in the image in case there exist multiple users in the image) with the ground truth garment segmentation provided as part of the segmentation training image data 502. Based on a difference threshold or deviation of the comparison, the machine learning technique module 512 updates one or more coefficients or parameters and obtains one or more additional segmentation training images. After a specified number of epochs or batches of training images have been processed and/or when the difference threshold or deviation reaches a specified value, the machine learning technique module 512 completes training and the parameters and coefficients of the machine learning technique module 512 are stored in the trained machine learning technique(s) 307.

In some examples, the machine learning technique module 512 implements multiple segmentation models of the machine learning technique. Each segmentation model of the machine learning technique module 512 may be trained on a different set of training images associated with a specific resolution. Namely, one of the segmentation models can be trained to estimate a garment segmentation for images having a first resolution (or a first range of resolutions). A second of the segmentation models can be trained to estimate a garment segmentation for images having a second resolution (or a second range of resolutions different from the first range of resolutions). In this way, different complexities of the machine learning technique module 512 can be trained and stored. When a given device having certain capabilities uses the AR/VR application, a corresponding one of the various garment segmentation models can be provided to perform the garment segmentation that matches the capabilities of the given device. In some cases, multiple garment segmentation models of each of the machine leaning techniques implemented by the AR fashion control system 224 can be provided each configured to operate with a different level of complexity. The appropriate segmentation model(s) with the appropriate level of complexity can then be provided to a client device 102 for segmenting garments depicted in one or more images.

In some examples, during training, the machine learning technique module 512 receives 2D skeletal joint information from a skeletal key-points module 511. The skeletal key-points module 511 tracks skeletal key points of a user depicted in a given training image (e.g., head joint, shoulder joints, hip joints, leg joints, and so forth) and provides the 2D or 3D coordinates of the skeletal key points. This information is used by the machine learning technique module 512 to identify distinguishing attributes of the garment depicted in the training image.

The garment segmentation generated by the machine learning technique module 512 is provided to the upper garment segmentation module 514. The upper garment segmentation module 514 can determine that the elbow joint output by the skeletal key-points module 511 is at a position that is within a threshold distance away from a given edge of the border of the shirt garment segmentation. In response, the upper garment segmentation module 514 can determine that the garment corresponds to a t-shirt or short sleeve shirt and that the given edge corresponds to a sleeve of the shirt. In such circumstances, the upper garment segmentation module 514 can adjust weights of the parameters or the loss function used to update parameters of the machine learning technique module 512 to improve segmentation of upper body garments, such as shirts. More specifically, the upper garment segmentation module 514 can determine that a given distinguishing attribute is present in the garment segmentation that is generated based on a comparison of skeletal joint positions to borders of the garment segmentation. In such circumstances, the upper garment segmentation module 514 adjusts the loss function or weights used to update the parameters of the machine learning technique module 512 for the training image depicting the garment with the distinguishing attribute. Similarly, the upper garment segmentation module 514 can adjust the loss or the parameter weights based on a difference between the garment segmentation and the pixels corresponding to the background of the image.

The upper garment segmentation module 514 is used to track a 2D or 3D position of the segmented shirt in subsequent frames of a video. This enables one or more AR elements to be displayed on the shirt and be maintained at their respective positions on the shirt as the position of the shirt moves around the screen. In this way, the upper garment segmentation module 514 can determine and track which portions of the shirt are currently shown in the image that depicts the user and to selectively adjust the corresponding AR elements that are displayed. For example, a given AR element can be displayed on a left sleeve of the shirt in a first frame of the video. The upper garment segmentation module 514 can determine that in a second frame of the video the user has turned left, meaning that the left sleeve no longer appears in the second frame. In response, the upper garment segmentation module 514 can omit entirely or a portion of the given AR element that was displayed on the left sleeve of the shirt.

After training, AR fashion control system 224 receives an input image 501 (e.g., monocular image depicting a user wearing a garment or multiple users wearing respective garments) as a single RGB image from a client device 102. The AR fashion control system 224 applies the trained machine learning technique module 512 to the received input image 501 to extract one or more features of the image to generate a segmentation of the garment or garments depicted in the image 501. This segmentation is provided to the upper garment segmentation module 514 to track the 2D or 3D position of the shirt in the current frame of the video and in subsequent frames.

Figure 6:
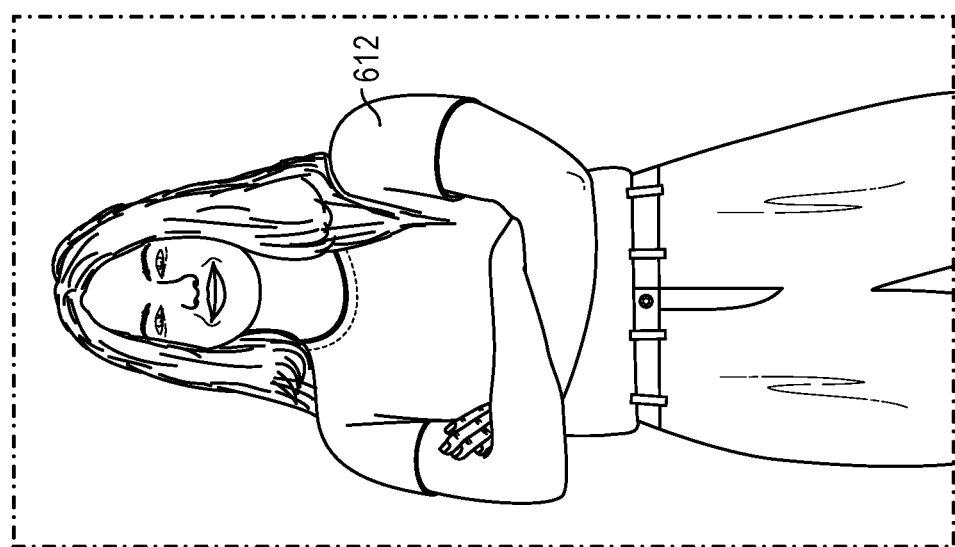
FIGS. 6, 7A, 7B, 8, and 9 are diagrammatic representations of outputs of the AR fashion control system, in accordance with some examples.

FIG. 6 is a diagrammatic representation of outputs of the AR fashion control system 224, in accordance with some examples. Specifically, FIG. 6 shows a garment segmentation 600 generated by the upper garment segmentation module 514. In one example, the upper garment segmentation module 514 generates a first garment segmentation 612 representing pixel locations of a shirt worn by a user. In another example, the upper garment segmentation module 514 generates a second garment segmentation representing pixel locations of a short sleeve shirt worn by a user. In another example, the upper garment segmentation module 514 generates a third garment segmentation representing pixel locations of a jacket worn by a user.

Referring back to FIG. 5, AR effect selection module 519 receives from a facial expression identification module 530 an indication (e.g., a mood or emotion) associated with a facial expression performed by a user or person depicted in an image or video captured by a client device 102. Based on the facial expression performed by the user, the AR effect selection module 519 selects and applies one or more AR elements to the shirt segmentation received from the upper garment segmentation module 514. This shirt segmentation combined with the one or more AR elements is provided to the image modification module 518 to render an image or video that depicts the user wearing a shirt with the one or more AR elements.

For example, a user of the AR/VR application may be presented with an option to perform facial expressions to control display of AR elements on a shirt worn by the user. In response to receiving a user selection of the option, a camera (e.g., front-facing or rear-facing camera) is activated to begin capturing an image or video of the user wearing a shirt. The image or video depicting the user wearing the shirt is provided to the facial expression identification module 530 to detect a facial expression performed by the user. This facial expression is used by the AR effect selection module 519 to select between various applications/modifications of AR elements displayed on the shirt worn by the user. FIGS. 7A, 7B, 8, and 9 show illustrative outputs of one or more of the visual effects that can be selected by the AR effect selection module 519 based on the facial expressions detected as being performed by the user or person depicted in the image or video received from the client device 102.

The image modification module 518 can adjust the image captured by the camera based on the AR effect selected by the visual effect selection module 519. The image modification module 518 adjusts the way in which the garment worn by the user is/are presented in an image, such as by changing the color or occlusion pattern of the garment(s) worn by the user based on the garment segmentation and applying one or more AR elements (AR graphical elements) to the garment worn by the user depicted in the image or video. Image display module 520 combines the adjustments made by the image modification module 518 into the received monocular image depicting the user's body. The image is provided by the image display module 520 to the client device 102 and can then be sent to another user or stored for later access and display.

In some examples, the image modification module 518 and/or the facial expression identification module 530 receive 3D body tracking information representing the 3D positions of the user depicted in the image from the 3D body tracking module 513. The 3D body tracking module 513 generates the 3D body tracking information by processing the image 501 and the monocular video 503 using additional machine learning techniques. The image modification module 518 can also receive a whole-body segmentation representing which pixels in the image correspond to the whole body of the user from another machine learning technique. The whole-body segmentation can be received from the whole-body segmentation module 515. The whole-body segmentation module 515 generates the whole body segmentation by processing the image 501 using a machine learning technique.

The facial expression identification module 530 can implement one or more machine learning techniques (e.g., neural networks) to estimate or identify a mood or emotion associated with a facial expression performed by a user or person depicted in an image. Specifically, during training, the facial expression identification module 530 receives a given training image (e.g., monocular image 501 depicting a facial expression performed by a user) from segmentation training image data 502. The facial expression identification module 530 applies one or more machine learning techniques to facial features of the person depicted in the given training image. The facial expression identification module 530 extracts one or more facial features from the given training image to estimate a mood or emotion associated with the facial features of the person depicted in the image. The facial expression identification module 530 compares the estimated mood or emotion with the ground truth garment mood or emotion provided as part of the segmentation training image data 502. Based on a difference threshold or deviation of the comparison, the facial expression identification module 530 updates one or more coefficients or parameters and obtains one or more additional segmentation training images. After a specified number of epochs or batches of training images have been processed and/or when the difference threshold or deviation reaches a specified value, the facial expression identification module 530 completes training and the parameters and coefficients of the facial expression identification module 530 are stored in the trained machine learning technique(s) 307.

After being trained, the facial expression identification module 530 receives an image depicting a person's face. The facial expression identification module 530 processes facial features of the facial expression of the person's face to estimate a mood or emotion associated with the facial features. The estimated mood or emotion is provided to the AR effect selection module 519 to apply one or more AR effects to the image depicting the person's face, such as by applying the one or more AR effects to a shirt worn by the person depicted in the image or video. In other implementations, the facial expression identification module 530 obtains one or more facial features of the person's face and searches a database of facial features to identify facial features that match the obtained facial features. The identified facial features in the database can be associated with one or more moods or emotions. The facial expression identification module 530 then retrieves the mood or emotion associated with the identified facial features to provide to the AR effect selection module 519.

The image modification module 518 can control the display of virtual or AR elements based on the garment segmentation provided by the upper garment segmentation module 514 and based on the 3D body tracking positions of the user and the whole-body segmentation of the user. Specifically, the image modification module 518 can control the occlusion pattern of an AR element relative to the real-world garment corresponding to the garment segmentation. Namely, the image modification module 518 determines which portion of the AR element to occlude with pixels of the real-world garment and/or also determines which portion of the real-world garment pixels to occlude with pixels of the AR element.

In one example, the AR effect selection module 519 may implement one or more machine learning techniques (e.g., neural networks) to estimate or identify a makeup classification associated with makeup features applied to a face of a user or person depicted in an image. Specifically, during training, the AR effect selection module 519 receives a given training image (e.g., monocular image 501 depicting makeup applied to a face of a user) from segmentation training image data 502. The AR effect selection module 519 applies one or more machine learning techniques to makeup features of the makeup applied to the person depicted in the given training image. The AR effect selection module 519 extracts one or more makeup features from the given training image to estimate a makeup classification associated with the makeup features of the makeup applied to the face of the person depicted in the image. The AR effect selection module 519 compares the estimated makeup classification (e.g., goth, animal style, and so forth) with the ground truth garment makeup classification provided as part of the segmentation training image data 502. Based on a difference threshold or deviation of the comparison, the AR effect selection module 519 updates one or more coefficients or parameters and obtains one or more additional segmentation training images. After a specified number of epochs or batches of training images have been processed and/or when the difference threshold or deviation reaches a specified value, the AR effect selection module 519 completes training and the parameters and coefficients of the AR effect selection module 519 are stored in the trained machine learning technique(s) 307.

After being trained, the AR effect selection module 519 receives an image depicting makeup applied to a person's face. The AR effect selection module 519 processes makeup features of the makeup applied to the face the person to estimate a makeup classification associated with the makeup features. The estimated makeup classification is used to apply one or more AR effects to the image depicting the person's face, such as by applying the one or more AR effects to a shirt worn by the person depicted in the image or video. In other implementations, the AR effect selection module 519 obtains one or more makeup features and searches a database of makeup features to identify makeup features that match the obtained facial features. The identified makeup features in the database can be associated with one or more makeup classifications. The AR effect selection module 519 then retrieves the makeup classification associated with the identified makeup features to select and generate the corresponding AR effects on the shirt worn by the person depicted in the image.

Figure 7A:
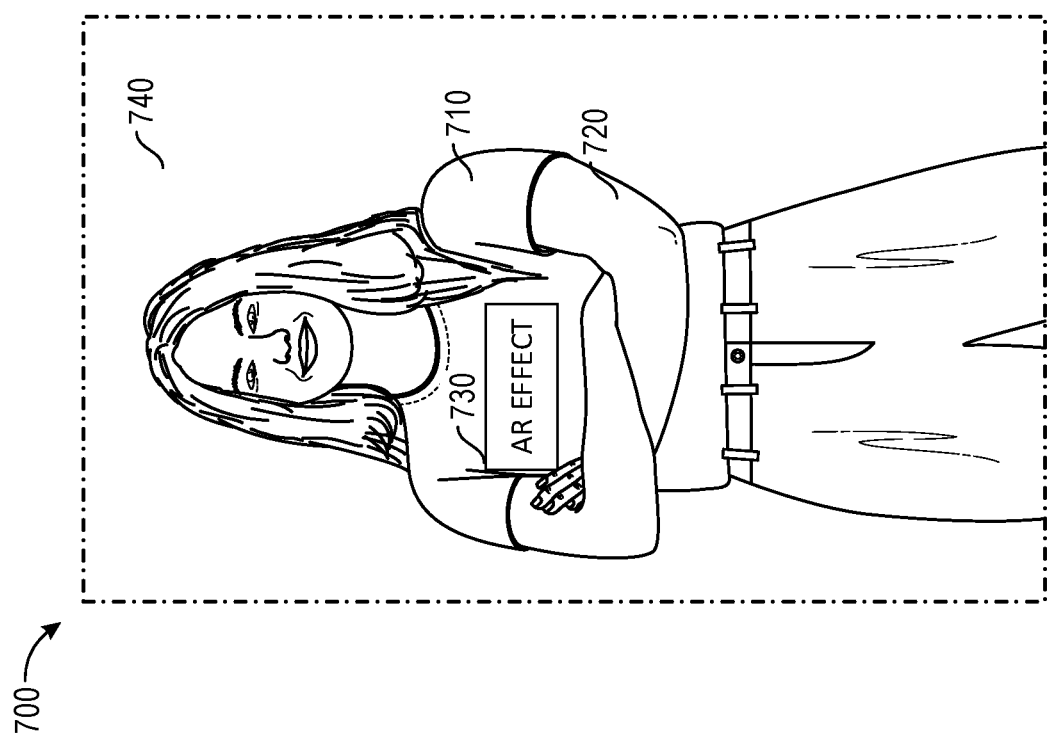

In one example, as shown in FIG. 7A, the AR effect selection module 519 can apply one or more AR effects 730 to a shirt 710 worn by a user 720 depicted in an image 700 captured by a client device 102 based on a facial expression of the user 720. For example, the AR effect selection module 519 can apply a shirt color AR effect to modify a color of the shirt 710 based on the mood or emotion associated with the facial expression of the user 720. The shirt color AR effect can be adjusted in real time as the facial expression of the user 720 changes in subsequent frames of a video. In another example, the AR effect selection module 519 can apply a background color AR effect to modify a color of a background 740 based on the mood or emotion associated with the facial expression of the user 720. The background color AR effect can be adjusted in real time as the facial expression of the user 720 changes in subsequent frames of a video.

In another example, the AR effect selection module 519 can generate an image or video, as the AR effects 730, for display on the shirt 710 worn by the user 720 depicted in the image 700. The image or video can be rendered on the shirt 710 worn by the user 720 in response to detecting a particular facial expression; or an image or video that is playing or displayed in the background 740 can be adjusted based on changes to facial expressions of the person depicted in the image or video. For example, the AR effect selection module 519 can receive indication of a particular mood or emotion associated with a facial expression of the user 720 depicted in the image 700. The AR effect selection module 519 can search a database of words to identify one or more words that are associated with the facial expression (e.g., the emotion or mood of the facial expression). The messaging client 104 can select a subset of the identified words, such as based on a rank, popularity, user profile, randomness, uniqueness, or any combination thereof. The AR effect selection module 519 can then search for an image or video (e.g., an avatar or emoji) associated with the selected subset of the identified words and add the image or video as the AR effects 730 to the shirt 710 worn by the user 720 in the image 700.

In one implementation, the AR effect selection module 519 can control playback of a video or apply a media item adjustment parameter to an image or video presented on the image 700 based on the facial expression of the user 720. For example, the AR effect selection module 519 can adjust the aspect ratio, the brightness, pause, play, fast-forward or rewind an image or video that is displayed in the image 700 based on the facial expression of the user 720. Any one or multiple media item adjustment parameters can be applied in response to a particular facial expression being detected. As different facial expressions are detected, the AR effect selection module 519 selects and applies different media item adjustment parameters.

As one example, the AR effect selection module 519 can adjust a fashion item pattern, type or style based on makeup applied to a face of a person depicted in an image or video. For example, the AR effect selection module 519 can process one or more facial features of the user 720 depicted in the image 700. The AR effect selection module 519 can determine a style of the makeup on the face of the user, as discussed above. The AR effect selection module 519 can search a database of fashion item patterns, types or styles to identify a fashion item pattern, type, or style associated with the style of makeup. The AR effect selection module 519 can then select a given one of the fashion item patterns, styles, or types to generate the AR effect 730 associated with the selected fashion item pattern, style, or type. The AR effect selection module 519 applies the AR effect 730 to the fashion item worn by the user 720 depicted in the image 700. In this way, the AR effect selection module 519 can adjust the fashion item or fashion items worn by the user 720 depicted in the image 700 to match a makeup style associated with makeup on the face of the user 720, such as by applying one or more AR effects 730 to one or more articles of clothing worn by the user 720.

In one example, the AR effect selection module 519 can generate, as the AR effects 730, text for display on the shirt worn by the user 720 depicted in the image 700. The text can be rendered on the shirt 710 worn by the user 720 in response to detecting a particular facial expression. For example, the AR effect selection module 519 can receive indication of a particular facial expression of the user 720 from the facial expression identification module 530. The AR effect selection module 519 can search a database of words to identify one or more words that are associated with the facial expression (e.g., the emotion or mood of the facial expression). The AR effect selection module 519 can select a subset of the identified words, such as based on a rank, popularity, user profile, randomness, uniqueness, or any combination thereof. The AR effect selection module 519 can then add an AR effect 730 that includes text to the shirt 710 worn by the user 720 in the image 700. The AR effect selection module 519 can include, in the text of the AR effect 730, the selected subset of the identified words.

Figure 7B:
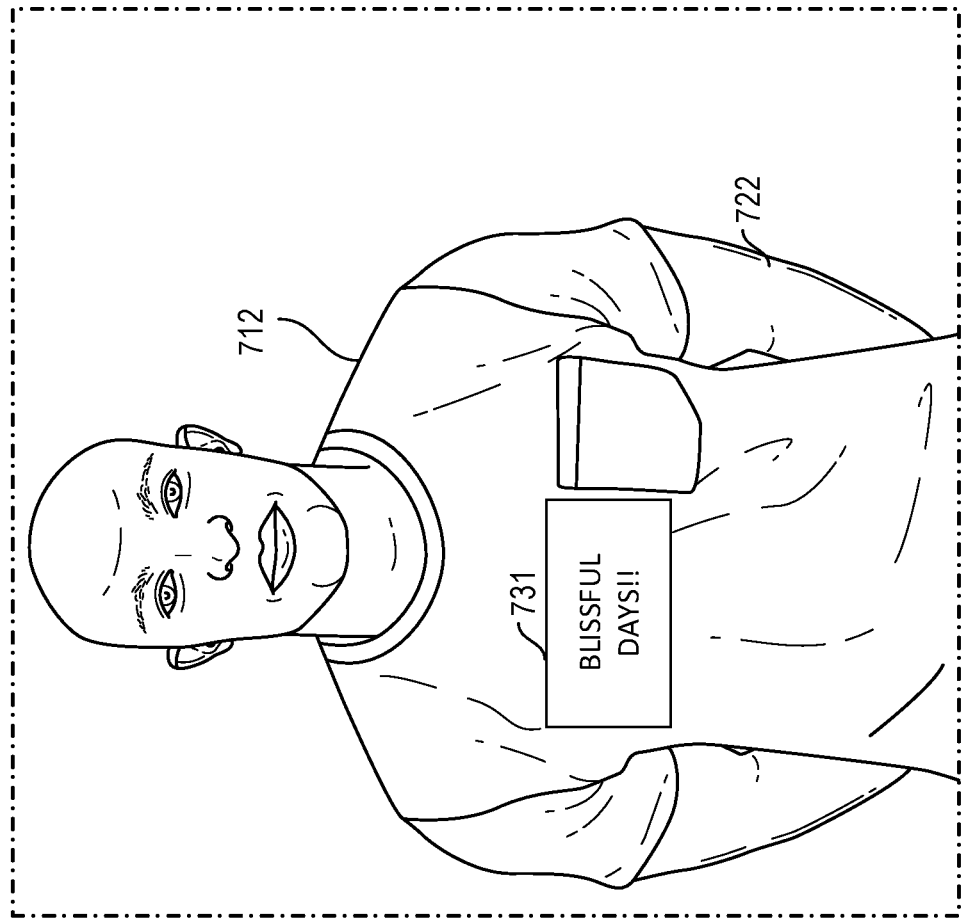

In another example, as shown in FIG. 7B, the AR effect selection module 519 can replace words of existing text with other words based on changes to facial expressions of the user 722 depicted in the image or video 701. For example, the AR effect selection module 519 can detect a phrase 731 written physically on the shirt 712 worn by the user 722 depicted in the image or video 701. The AR effect selection module 519 can perform word recognition to the phrase to identify a word associated with an adjective that describes an emotion or mood. In response to identifying the word associated with the adjective, the AR effect selection module 519 can generate an augmented reality version of the identified word and include text in the augmented reality version that represents the facial expression. The AR effect selection module 519 can replace a portion of the phrase 731 (e.g., a particular word) with the augmented reality version of the word, such as by overlaying the augmented reality version of the word on top of the physical word in the phrase 731 that is on the shirt 712 worn by the user 722 depicted in the image or video 701.

Figure 8:
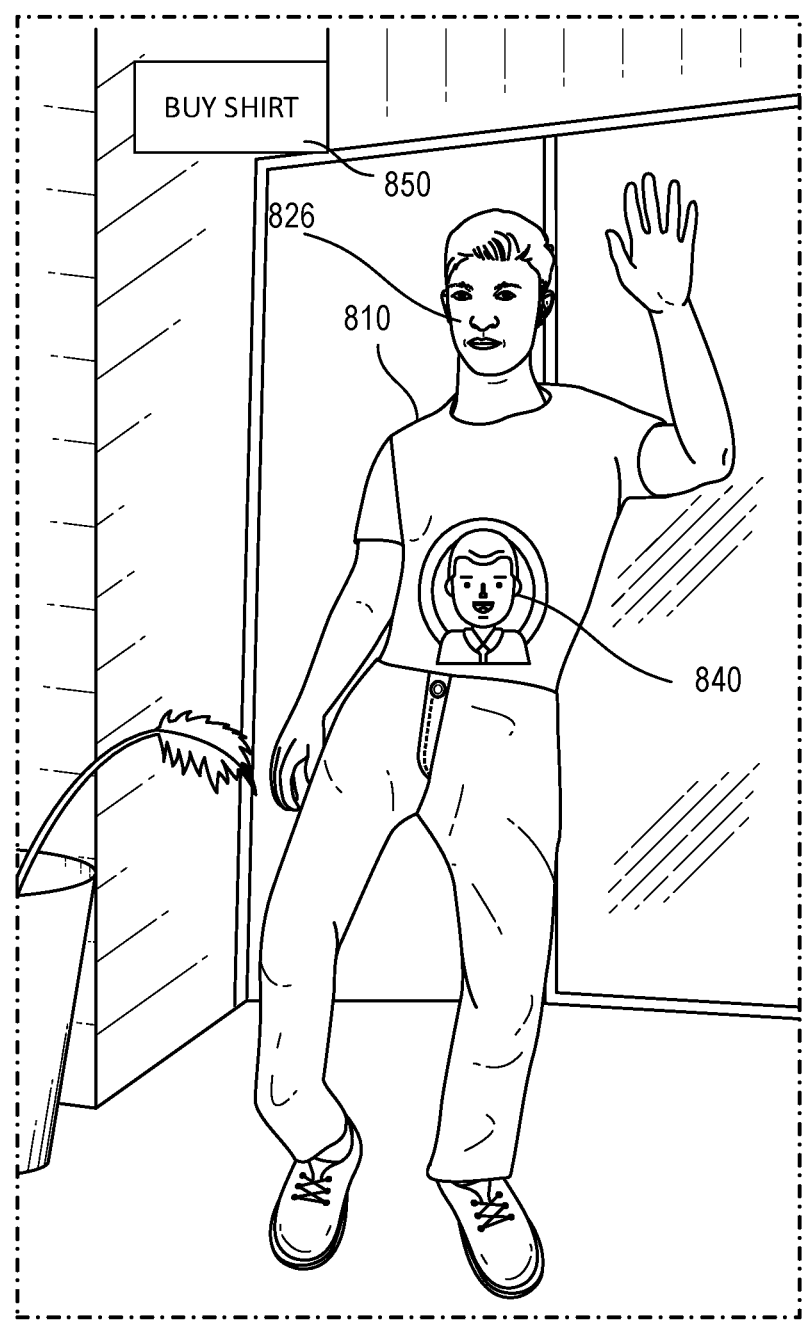

As another example, the AR effect selection module 519 can adjust an expression of an augmented reality avatar or emoji depicted on a shirt worn by a person in the image or video to match the facial expression of the person depicted in the image or video. For example, as shown in FIG. 8, the AR effect selection module 519 can detect a face 826 of a person depicted in the image or video 800. In response to detecting the face 826, the AR effect selection module 519 can receive an indication of an emotion or mood associated with a facial expression of the detected face 826. The AR effect selection module 519 can search a database of avatar or emoji expressions that are associated with the facial expression (e.g., the emotion or mood of the facial expression). The AR effect selection module 519 can then adjust a facial expression of an avatar or emoji 840 displayed on a shirt 810 worn by the person depicted in the image or video 800 to match or correspond to the facial expression of the person depicted in the image or video 800. The facial expression of the avatar or emoji 840 can be updated in real time based on detecting changes to the facial expression of the detected face 826. In one implementation, the AR effect selection module 519 can present a purchase option 850 together with the depiction of the shirt and avatar or emoji 840 on top of the shirt 810. In response to receiving a user selection of the purchase option 850, the AR effect selection module 519 can transmit an image of the shirt 810 with the avatar or emoji 840 having the matched facial expression to a vendor that manufactures shirts. The AR effect selection module 519 can instruct the vendor to create a physical shirt in a size associated with the person depicted in the image or video 800 that resembles the shirt worn by the person augmented with the avatar or emoji 840. The manufactured shirt is then shipped to the home of the person.

Figure 9:
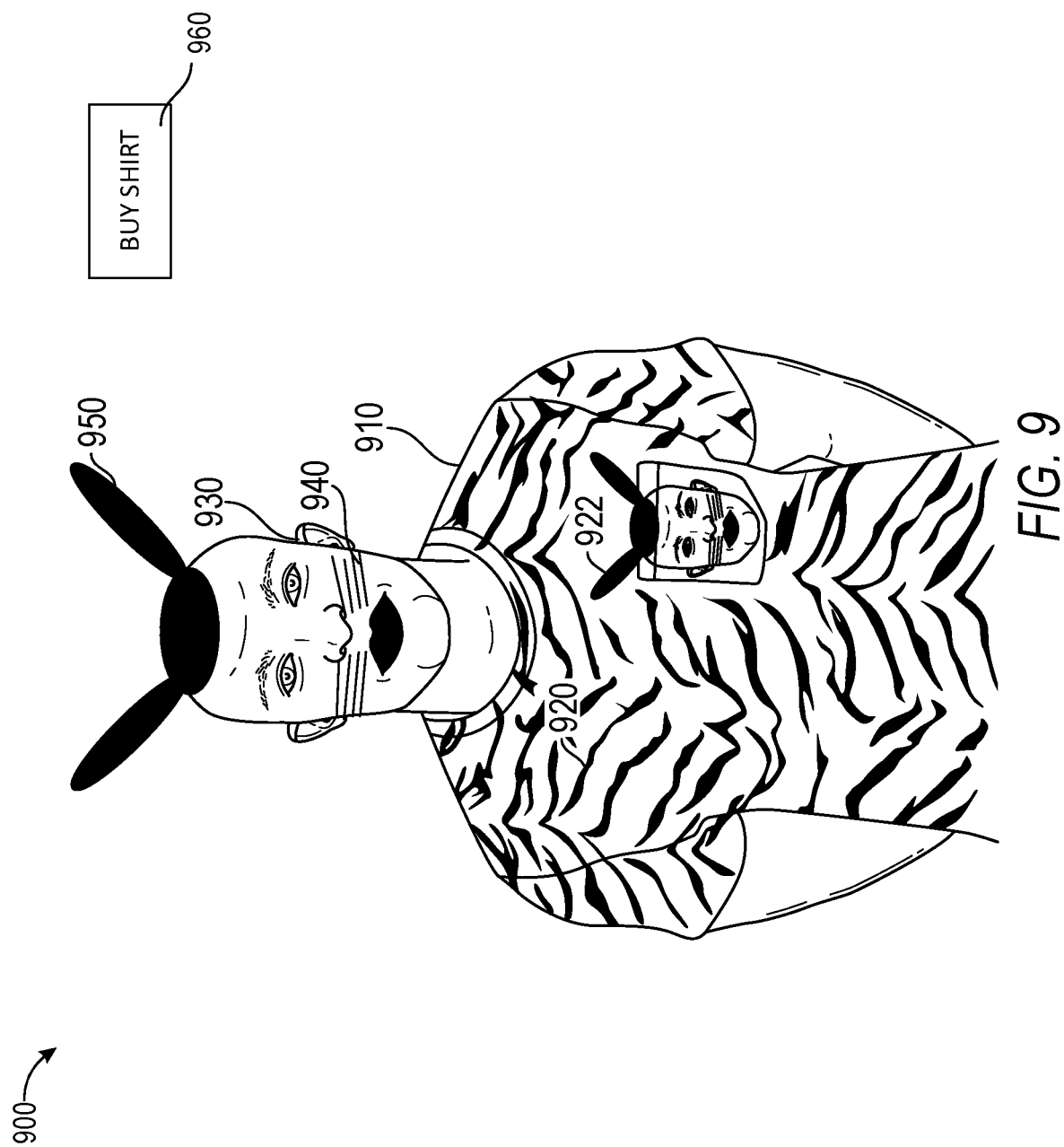

As another example, as shown in FIG. 9, the AR effect selection module 519 can determine that the style of makeup 940 applied to a face 930 of a user is associated with a particular animal (e.g., a lion or zebra). In such cases, the AR effect selection module 519 obtains a characteristic of the animal (e.g., zebra or lion stripes) and applies augmented reality zebra or lion stripes 920 to a shirt 910 worn by the user depicted in the image or video 900. In an implementation, the AR effect selection module 519 adds an augmented reality headwear 950 to the person's head (e.g., to represent horns) of the animal. As another example, the AR effect selection module 519 can determine that the makeup type of the makeup 940 applied to the face 930 is associated with a goth style and, in response, the AR effect selection module 519 modifies a color, pattern, or type of clothing worn by the user depicted in the image or video 900. The modification can be performed by occluding or overlaying a portion of the physical clothing worn by the user with augmented reality clothing.

The AR effect selection module 519 can display, on the shirt 910 depicted in the image or video 900, an augmented reality version 922 of an augmented reality facial effect applied to the face 930 of the user depicted in the image or video 900. Specifically, the messaging client 104 can detect an augmented reality facial effect applied to the face 930 of the user depicted in the image (e.g., such as augmented reality makeup). The AR effect selection module 519 can, in response, generate an augmented reality version 922 of the augmented reality facial effect by copying a style, pattern, pose, outline, and color of the face 930 of the user to which the augmented reality facial effect has been applied into an augmented reality version 922. The AR effect selection module 519 can then overlay the augmented reality version 922 of the facial effect on top of a specified portion of the shirt 910 worn by the user depicted in the image or video 900. In some cases, the AR effect selection module 519 can present a purchase option 960 together with the depiction of the shirt 910 and augmented reality version 922 of the facial effect on top of the shirt 910. In response to receiving a user selection of the purchase option 960, the AR effect selection module 519 can transmit an image of the shirt 910 with the augmented reality version 922 of the facial effect to a vendor that manufactures shirts. The AR effect selection module 519 can instruct the vendor to create a physical shirt in a size associated with the user that resembles the shirt 910 worn by the user augmented with the augmented reality version 922 of the facial effect. The manufactured shirt is then shipped to the home of the user.

The image modification module 518 determines which subset of pixels of the real-world shirt overlap a subset of pixels of the music AR element(s). If the occlusion pattern indicates that the AR element(s) occludes the real-world shirt garment, the image modification module 518 replaces the subset of pixels of the real-world shirt with the subset of pixels of the AR element(s).

Figure 10:
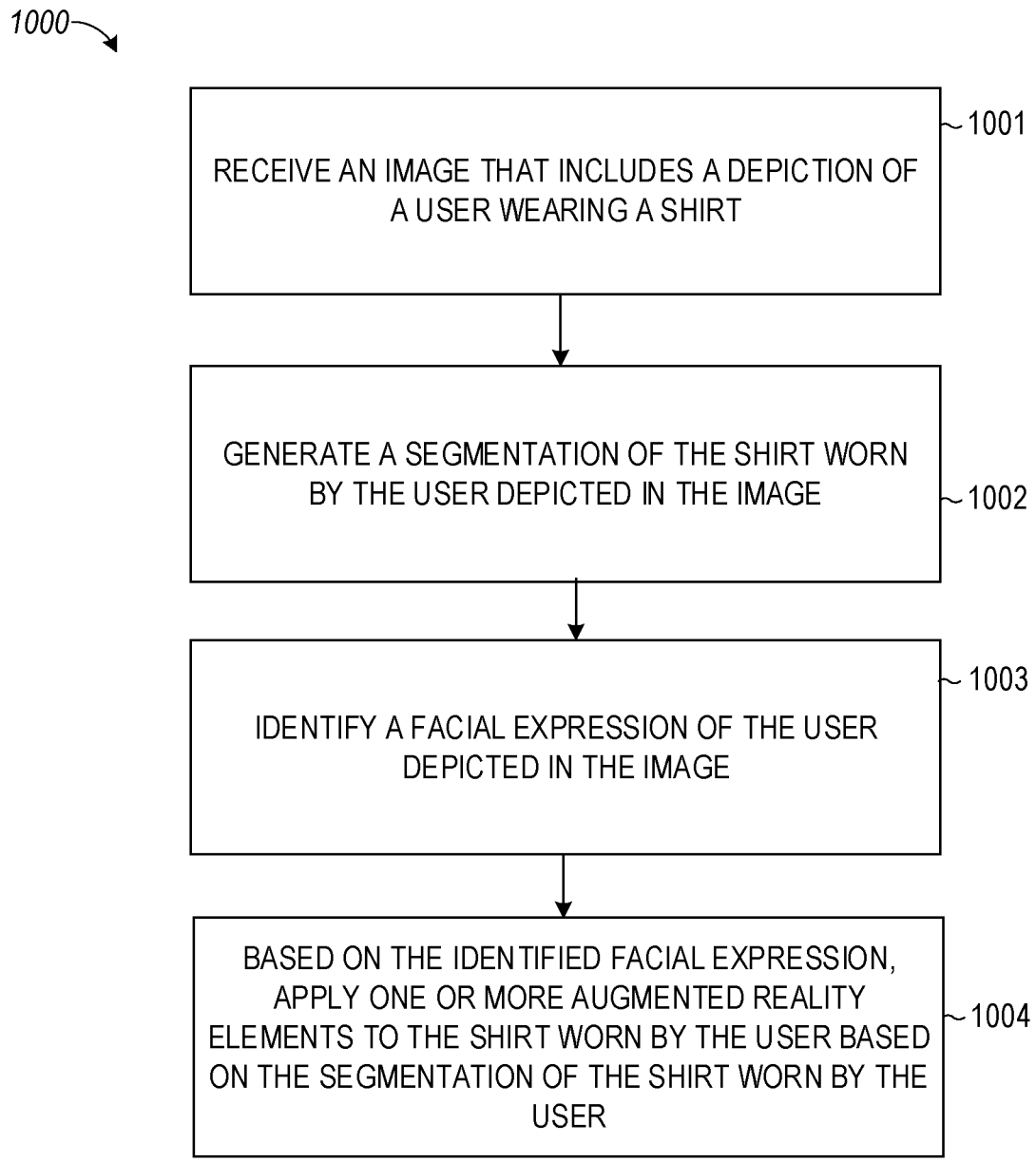
FIG. 10 is a flowchart illustrating example operations of the AR fashion control system, according to some examples.

FIG. 10 is a flowchart of a process 1000 performed by the AR fashion control system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 1001, the AR fashion control system 224 (e.g., a client device 102 or a server) receives an image that includes a depiction of a person wearing a fashion item (e.g., a shirt), as discussed above.

At operation 1002, the AR fashion control system 224 generates a segmentation of the shirt worn by the person depicted in the image, as discussed above.

At operation 1003, the AR fashion control system 224 identifies a facial expression of the person depicted in the image, as discussed above.

At operation 1004, the AR fashion control system 224, based on the identified facial expression, applies one or more augmented reality elements to the shirt worn by the person based on the segmentation of the shirt worn by the person, as discussed above.

Machine Architecture

Figure 11:
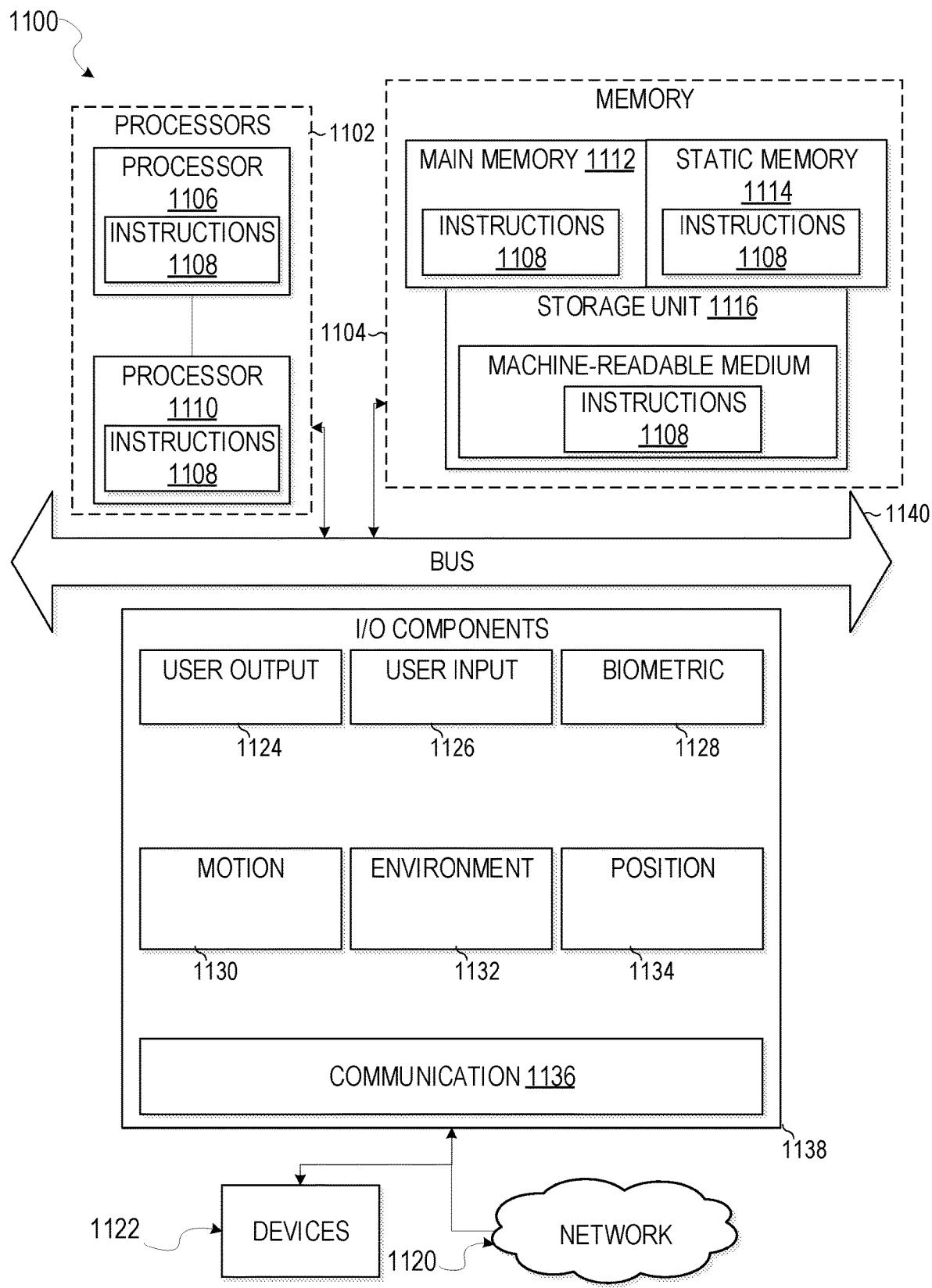
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
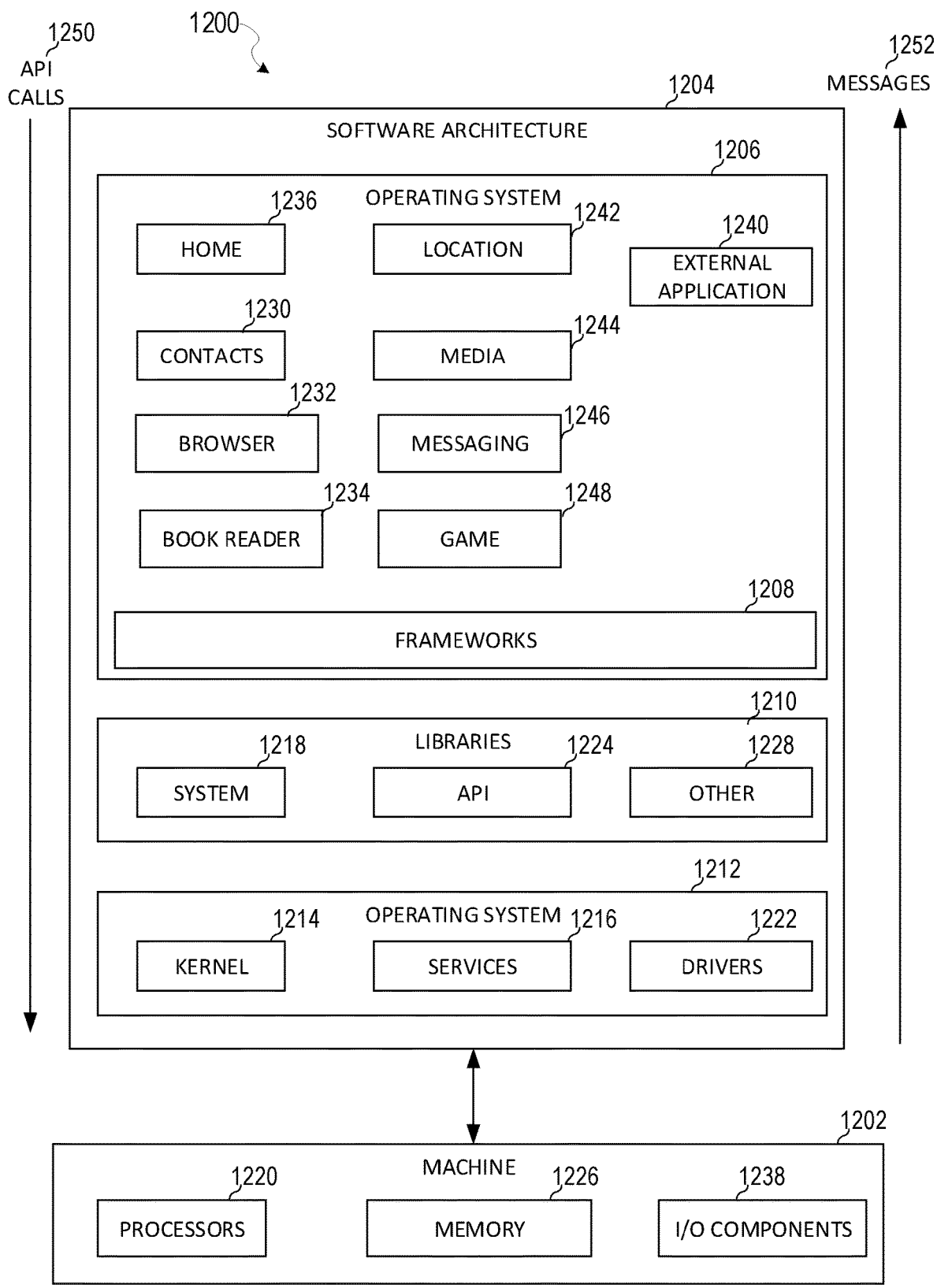
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by one or more processors of a client device, an image that includes a depiction of a person wearing a fashion item;
generating, by the one or more processors, a segmentation of the fashion item worn by the person depicted in the image;
detecting a phrase physically written on the fashion item worn by the person depicted in the image;
processing a facial expression of the person depicted in the image using a machine learning model to estimate an emotion or mood of the person depicted in the image;
identifying a word that corresponds to the emotion or mood of the person depicted in the image that has been estimated by processing the facial expression using the machine learning model;
generating an augmented reality element comprising the identified word that corresponds to the emotion or mood of the person that has been estimated by processing the facial expression using the machine learning model; and in response to determining that the image includes the depiction of the person wearing the fashion item, replacing a portion of the phrase physically written on the fashion item with the generated augmented reality element comprising the identified word.

2. The method of claim 1, wherein the fashion item comprises a shirt, and wherein applying the one or more augmented reality elements to the shirt worn by the person further comprises:

generating text for display on the shirt;

selecting one or more words for the text based on the facial expression of the person; and adjusting the generated text to include the selected one or more words.

3. The method of claim 1, further comprising:

adding text to the fashion item worn by the person depicted in the image in response to identifying the facial expression.

4. The method of claim 3, wherein adding the text comprises:

selecting one or more words associated with the facial expression; and generating the text to include the selected one or more words for display on the fashion item.

5. The method of claim 1, further comprising:

searching for a plurality of images or videos that is associated with the emotion and that have a popularity value that transgresses a popularity threshold;

selecting a random image or video from the plurality of images or videos; and adding the selected random image or video to the fashion item worn by the person depicted in the image.

6. The method of claim 5, wherein adding the image or video further comprises:

selecting an image or video adjustment parameter associated with the facial expression; and adjusting the image or video based on the selected image or video adjustment parameter.

7. The method of claim 6, wherein the image or video adjustment parameter comprises an aspect ratio modification or a playback selection.

8. The method of claim 1, further comprising:

adding an avatar or emoji to the fashion item worn by the person depicted in the image in response to identifying the facial expression; and adjusting an expression of the avatar or emoji based on the facial expression of the person.

9. The method of claim 1, further comprising:

processing one or more facial features of the person depicted in the image to detect makeup on a face of the person;

determining a style of the makeup on the face of the person; and selecting, as the one or more augmented reality elements, a fashion item pattern or style corresponding to the style of the makeup on the face of the person.

10. The method of claim 9, further comprising:

obtaining makeup features of the makeup on the face of the person; and applying a machine learning technique to the makeup features to estimate a classification of the makeup on the face of the person, wherein the fashion item pattern or style is selected based on the classification of the makeup.

11. The method of claim 1, further comprising:

activating an augmented reality makeup experience;

applying augmented reality makeup to a face of the person depicted in the image;

determining a style of the augmented reality makeup applied to the face of the person; and selecting, as the one or more augmented reality elements, a fashion item pattern, type or style corresponding to the style of the augmented reality makeup applied to the face of the person.

12. The method of claim 11, wherein the style of the augmented reality makeup is associated with an animal, and wherein the fashion item pattern, type or style comprises a characteristic of the animal associated with the augmented reality makeup applied to the face of the person.

13. The method of claim 12, wherein the animal comprises a lion or zebra, and wherein the characteristic comprises lion or zebra stripes.

14. The method of claim 11, wherein the fashion item style comprises goth style that is applied to the fashion item or another garment worn by the person depicted in the image in response to determining the style of the augmented reality makeup.

15. The method of claim 1, further comprising:

determining that a style of makeup applied to a face of the person depicted in the image is associated with an animal; and adjusting an attribute of the fashion item worn by the person depicted in the image to correspond to a characteristic of the animal associated with the style of the makeup applied to the face of the person.

16. The method of claim 1, further comprising:

detecting an augmented reality facial effect applied to a face of the person depicted in the image;

generating, as the one or more augmented reality elements, an augmented reality version of the augmented reality facial effect; and displaying the augmented reality version of the augmented reality facial effect on the fashion item worn by the person depicted in the image.

17. The method of claim 16, further comprising generating a purchase option for display together with the augmented reality version of the augmented reality facial effect on the fashion item worn by the person depicted in the image, wherein in response to receiving a selection of the purchase option, a physical product comprising a depiction of the fashion item worn by the person and the augmented reality version of the augmented reality facial effect is customized and created.

18. A system comprising:

a processor of a client device; and a memory component having instructions stored thereon, when executed by the processor, causes the processor to perform operations comprising:

receiving an image that includes a depiction of a person wearing a fashion item;

generating a segmentation of the fashion item worn by the person depicted in the image;

detecting a phrase physically written on the fashion item worn by the person depicted in the image;

processing a facial expression of the person depicted in the image using a machine learning model to estimate an emotion or mood of the person depicted in the image;

identifying a word that corresponds to the emotion or mood of the person depicted in the image that has been estimated by processing the facial expression using the machine learning model;

generating an augmented reality element comprising the identified word that corresponds to the emotion or mood of the person that has been estimated by processing the facial expression using the machine learning model; and in response to determining that the image includes the depiction of the person wearing the fashion item, replacing a portion of the phrase physically written on the fashion item with the generated augmented reality element comprising the identified word.

19. The system of claim 18, the operations further comprising:

displaying a video on the fashion item worn by the person depicted in the image; and controlling playback of the video based on the facial expression of the person depicted in the image.

20. A non-transitory computer-readable storage medium having stored thereon instructions that, when executed by a processor of a client device, cause the processor to perform operations comprising:

receiving an image that includes a depiction of a person wearing a fashion item;

generating a segmentation of the fashion item worn by the person depicted in the image;

detecting a phrase physically written on the fashion item worn by the person depicted in the image;

processing a facial expression of the person depicted in the image using a machine learning model to estimate an emotion or mood of the person depicted in the image;

identifying a word that corresponds to the emotion or mood of the person depicted in the image that has been estimated by processing the facial expression using the machine learning model;

generating an augmented reality element comprising the identified word that corresponds to the emotion or mood of the person that has been estimated by processing the facial expression using the machine learning model; and in response to determining that the image includes the depiction of the person wearing the fashion item, replacing a portion of the phrase physically written on the fashion item with the generated augmented reality element comprising the identified word.

* * * * *